US012741425B2

(12) United States Patent
Wynne et al.

(10) Patent No.: US 12,741,425 B2
(45) Date of Patent: Sep. 22, 2026

(54) ADDITIVE MANUFACTURING ON AN APPLICATION-SPECIFIC SUBSTRATE

(71) Applicant: Intrepid Automation, Inc., San Diego, CA (US)

(72) Inventors: Ben Wynne, Escondido, CA (US); Ivan Dejesus Chousal, Chula Vista, CA (US); James Paul Ferguson, Big Bear City, CA (US)

(73) Assignee: Intrepid Automation, Inc., San Diego, CA (US)

( * ) Notice: Subject to any disclaimer, the term of this patent is extended or adjusted under 35 U.S.C. 154(b) by 0 days.

(21) Appl. No.: 19/297,749

(22) Filed: Aug. 12, 2025

(65) Prior Publication Data

US 2026/0048553 A1 Feb. 19, 2026

Related U.S. Application Data

(60) Provisional application No. 63/683,438, filed on Aug. 15, 2024, provisional application No. 63/683,457, filed on Aug. 15, 2024.

(51) Int. Cl.
*B29C 41/20* (2006.01)
*B29C 41/52* (2006.01)
(Continued)

(52) U.S. Cl.
CPC .......... *B29C 64/393* (2017.08); *B29C 64/129* (2017.08); *B29C 64/245* (2017.08);
(Continued)

(58) Field of Classification Search
CPC ....... B29C 41/20; B29C 41/52; B29C 64/124; B29C 64/129; B29C 64/135;
(Continued)

(56) References Cited

U.S. PATENT DOCUMENTS 5,705,117 A * 1/1998 O'Connor ............ B29C 64/135 264/401
10,759,116 B2 9/2020 Wynne et al.
(Continued)

FOREIGN PATENT DOCUMENTS

KR 20180110311 A 10/2018
WO 2019023749 A1 2/2019

OTHER PUBLICATIONS

International Search Report and Written Opinion dated Nov. 25, 2025 for PCT Patent Application No. PCT/IB2025/058207.

*Primary Examiner* — Leo B Tentoni
(74) *Attorney, Agent, or Firm* — MLO, a professional corp.

(57) ABSTRACT

A method includes providing a photoreactive 3D printing system (PRPS). An application-specific substrate is positioned in a holding device of the PRPS. Content is printed on the application-specific substrate. The content and the application-specific substrate are incorporated in a finished product after the printing. A method includes providing a PRPS. A global substrate is positioned in a holding device of the PRPS. A feature is printed on the global substrate. An application-specific substrate is positioned on the global substrate according to the feature. Content is printed on the application-specific substrate. The content and the application-specific substrate are incorporated in a finished product after the printing.

25 Claims, 39 Drawing Sheets

(51) Int. Cl.

| | |
|---|---|
| ***B29C 64/124*** | (2017.01) |
| ***B29C 64/129*** | (2017.01) |
| ***B29C 64/245*** | (2017.01) |
| ***B29C 64/393*** | (2017.01) |
| ***B29C 70/68*** | (2006.01) |
| ***B29C 70/70*** | (2006.01) |
| ***B33Y 50/02*** | (2015.01) |
| ***G05B 19/4099*** | (2006.01) |
| *B29L 31/00* | (2006.01) |
| *B29L 31/34* | (2006.01) |
| *B33Y 10/00* | (2015.01) |

(52) U.S. Cl.
CPC ....... *B33Y 50/02* (2014.12); *B29L 2031/3425* (2013.01); *B29L 2031/736* (2013.01); *B33Y 10/00* (2014.12); *G05B 2219/49013* (2013.01)

(58) Field of Classification Search
CPC ..... B29C 64/386; B29C 64/393; B29C 70/68; B29C 70/70; B33Y 10/00; B33Y 50/00; B33Y 50/02; G05B 19/4099; G05B 2219/49013
USPC ........ 264/40.1, 259, 271.1, 279, 279.1, 401; 700/120
See application file for complete search history.

(56) References Cited

U.S. PATENT DOCUMENTS

| | | | | |
|---|---|---|---|---|
| 11,054,808 | B2 | 7/2021 | Wynne et al. | |
| 11,110,650 | B1 | 9/2021 | Wynne et al. | |
| 11,623,397 | B2 | 4/2023 | Wynne et al. | |
| 12,370,743 | B2 | 7/2025 | Wynne et al. | |
| 12,434,430 | B2 | 10/2025 | Neal | |
| 2009/0173443 | A1* | 7/2009 | Kozlak ................ | B29C 64/129 156/303.1 |
| 2018/0193923 | A1 | 7/2018 | Koch et al. | |
| 2022/0355548 | A1 | 11/2022 | Wynne et al. | |

* cited by examiner

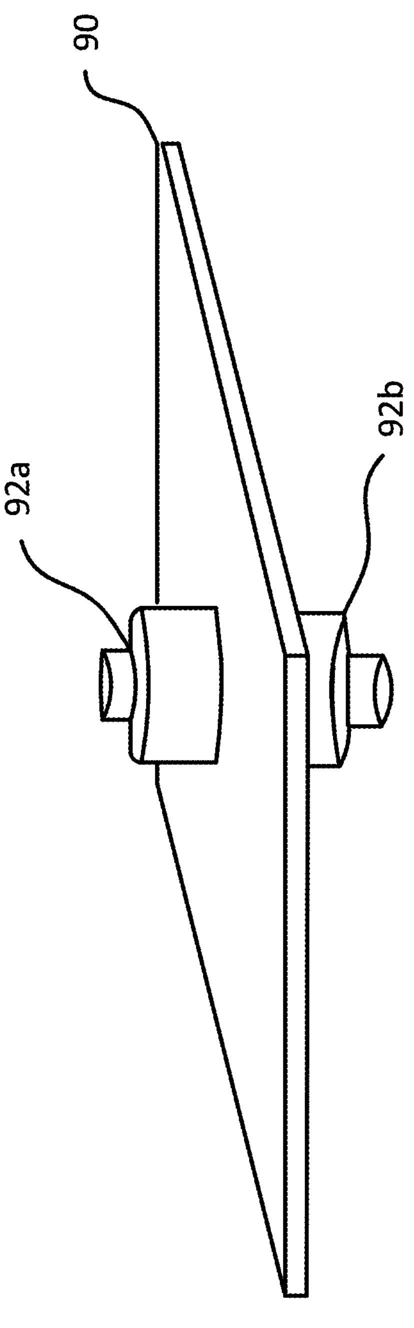
FIG. 14 - Prior Art

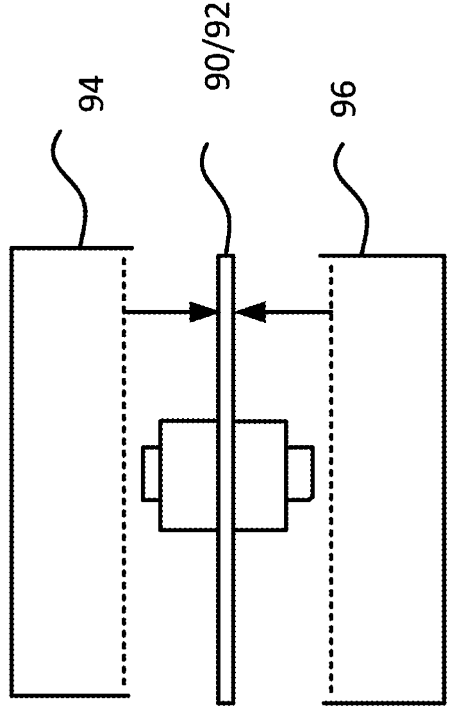
FIG. 15 - Prior Art

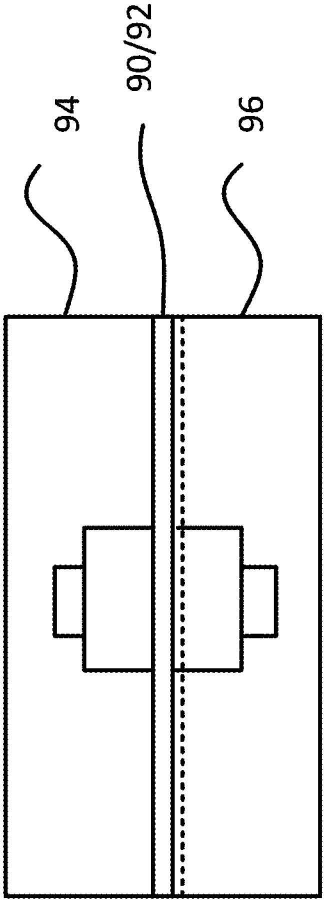
FIG. 16 - Prior Art

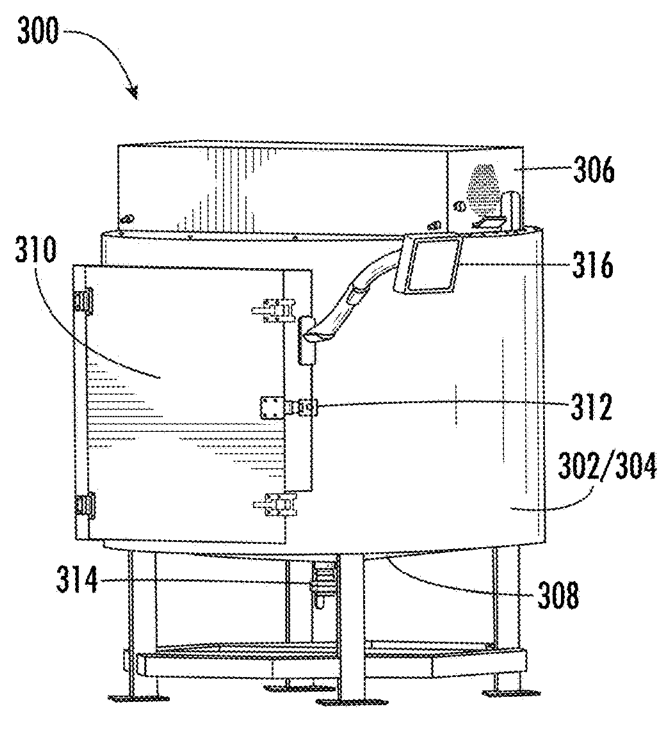
FIG. 25
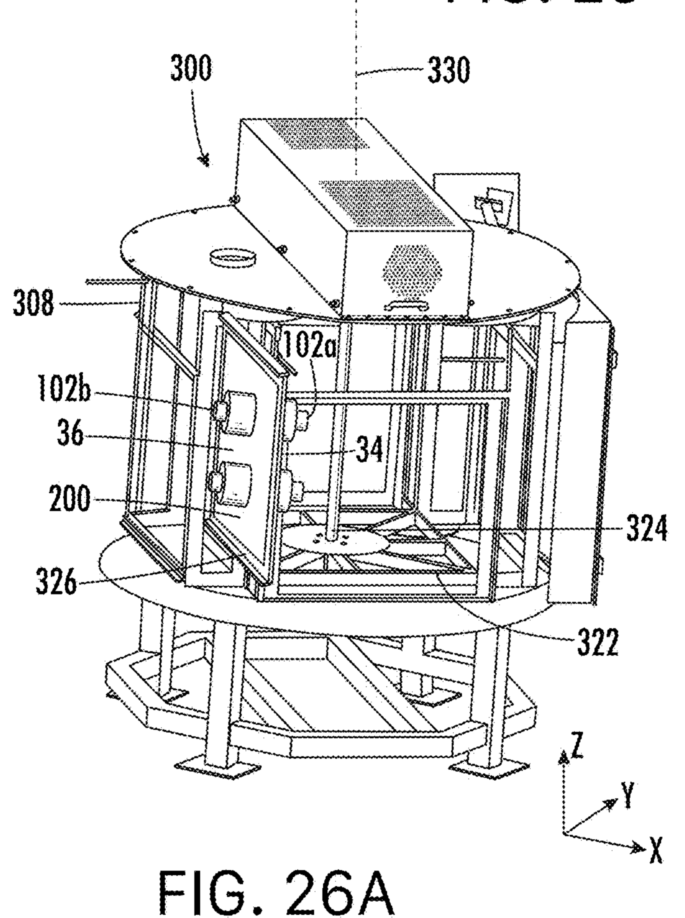
FIG. 26A
300
304
326
328
102b
102a
200
FIG. 26B

ADDITIVE MANUFACTURING ON AN APPLICATION-SPECIFIC SUBSTRATE

RELATED APPLICATIONS

This application claims priority to U.S. Provisional Patent Application No. 63/683,457, filed on Aug. 15, 2024, and entitled "Systems and Methods for Additive Manufacturing of Matchplate Patterns" and U.S. Provisional Patent Application No. 63/683,438, filed on Aug. 15, 2024, and entitled "Systems and Methods for Additive Manufacturing on a Substrate"; the contents of both are incorporated by reference in full.

BACKGROUND

Conventional 3D printing techniques are typically used to fabricate discrete, standalone components that are constructed directly on a build plate. These components often require post-processing or assembly into a larger structure as part of a multi-step manufacturing process. The final product may include multiple 3D printed parts as well as components fabricated using different manufacturing methods. While 3D printing enables complex geometries, the construction of parts on a flat build plate imposes limitations on flexibility and orientation during fabrication. In general, each printed component is treated as a separate entity, and subsequent parts are not commonly printed directly onto previously printed components.

Matchplates are critical components in casting processes such as sand casting, where they are used to form patterns that define the geometry of the final cast product. A typical matchplate comprises a metal or composite plate with patterns mounted on opposing sides, enabling precise alignment of the mold halves. Traditionally, matchplates were hand-carved from wood, a manual and labor-intensive process that lacked consistency and dimensional accuracy. In modern practice, matchplates are fabricated using subtractive manufacturing techniques such as milling, machining, or computer numerical control (CNC) cutting from solid material blocks. Although effective for high-volume production, these methods can be time-consuming and expensive, particularly for custom, low-volume, or prototype applications. They often require high-precision machining, result in significant material waste, and may impose limitations on the complexity of achievable geometries.

SUMMARY

A method includes providing a photoreactive 3D printing system (PRPS). An application-specific substrate is positioned in a holding device of the PRPS. Content is printed on the application-specific substrate. The content and the application-specific substrate are incorporated in a finished product after the printing.

A method includes providing a PRPS. A global substrate is positioned in a holding device of the PRPS. A feature is printed on the global substrate. An application-specific substrate is positioned on the global substrate according to the feature. Content is printed on the application-specific substrate. The content and the application-specific substrate are incorporated in a finished product after the printing.

BRIEF DESCRIPTION OF FIGURES

FIG. 2A is a perspective view of an example of an application-specific substrate, in accordance with some aspects.

FIG. 2B is a top view of the example of the application-specific substrate, in accordance with some aspects.

FIG. 6A is a top view of the camera positioned above the application-specific substrate, in accordance with some aspects.

FIG. 6B is a side view of the camera positioned above the application-specific substrate, in accordance with some aspects.

FIG. 14 is a perspective view of a matchplate with a first pattern and a second pattern attached, as known in the art.

FIGS. 15 and 16 are front views of a sand-casting process, as known in the art.

FIG. 25 is a perspective view of a spinning device, in accordance with some aspects.

FIG. 26A is a perspective view of a spinning device with exterior components removed, in accordance with some aspects.

FIG. 26B is a schematic of a portion of the spinning device with a populated matchplate mounted in a tray holder, in accordance with some aspects.

DETAILED DESCRIPTION

Figure 1A:
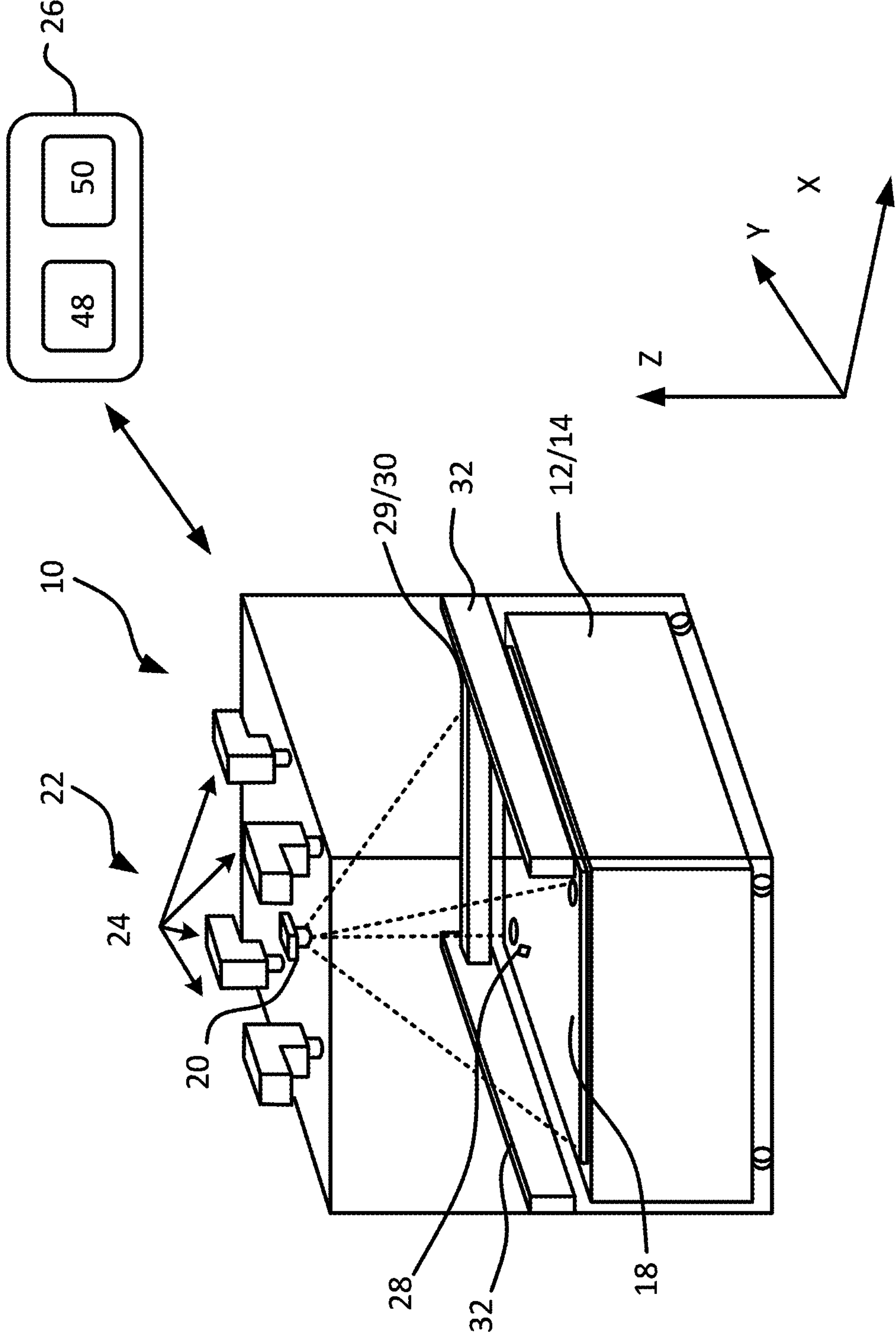
FIG. 1A is a perspective view of a schematic of an additive manufacturing system, in accordance with some aspects.

Conventionally, three-dimensional (3D) printing techniques produce discrete, standalone components that must be subsequently assembled into a final product. This multistep process increases production time, labor costs, and the risk of assembly errors. Aspects of the present disclosure relate to additive manufacturing systems and methods for 3D printing directly onto an application-specific substrate. Unlike traditional approaches that rely on a generic build plate, the disclosed systems deposit printed content directly onto a substrate that is intended to remain part of the finished product.

This approach eliminates the need to transfer and reassemble printed components onto separate structures, thereby streamlining the manufacturing workflow, reducing alignment errors, and allowing for the integration of complex geometries. In applications where precise placement and dimensional accuracy are critical, printing directly onto the application-specific substrate within the build chamber minimizes the need for secondary assembly and post-processing, resulting in improved efficiency, accuracy, and overall product quality.

Aspects of the present disclosure include the use of a feature on at least one of a first substrate, referred to as a global substrate, or a second substrate, referred to as an application-specific substrate, to facilitate alignment of printed content. In some examples, the feature may be a fiducial mark that is optically detected to facilitate the alignment of the content to be printed relative to the actual position and orientation of the substrate. In these cases, the substrate may be positioned arbitrarily within the build area, and the digital content is transformed accordingly to ensure accurate alignment of the printed content. In other examples, the feature may be a physical feature, such as at least one fixture element printed on the global substrate. These fixture elements are configured to receive and mechanically constrain the application-specific substrate in a defined position and orientation within the coordinate system of the printing system.

In other examples, the feature may be a defined portion of the application-specific substrate which is present in the application-specific substrate prior to printing. The defined portion may serve not only as a functional aspect of the finished part prior to printing, but also as alignment references during the printing process. The defined portion may be optically or mechanically detected and used to assist with positioning and alignment. In some aspects, a camera, sensor or similar device may detect one or more features, such as a fiducial mark, fixture element, or defined portion of the application-specific substrate, and transmit the information to a controller for processing. The processed data may be used to calibrate and control the image projection system to ensure accurate deposition of the printed content.

Examples herein disclose an application-specific substrate positioned into a holding device of a 3D printer, and content is printed directly onto that substrate. Once printing is complete, both the substrate and the printed content become part of the final product. In other cases, a global substrate is first positioned in the holding device, and a feature is printed on it for positioning and alignment of content. An application-specific substrate may be placed onto the global substrate using that printed feature as a guide, and content is printed on the application-specific substrate. As with the first example, both the application-specific substrate and the printed content remain part of the finished product.

FIG. 1A is a perspective view of a schematic of an additive manufacturing system, in accordance with some aspects. The additive manufacturing system is shown as a photoreactive 3D printing system (PRPS) 10. The PRPS 10 includes a vat 12 having a resin pool 14. Forks 16 are a holding device (shown in FIGS. 5A and 5B) configured to secure an application-specific substrate 18 and submerge it in the resin pool 14. In this example, the application-specific substrate 18 is held by the forks 16 and shown without printed content (e.g., blank application-specific substrate) such as at the beginning of a print job. A camera 20 is positioned above the vat 12 and configured to capture and transmit image data from the application-specific substrate 18. An image projection system 22 is positioned above the vat 12 and comprises an image projector 24 or a plurality of image projectors configured to project a composite image onto a surface of the resin pool 14.

Each image projector 24 of the plurality of image projectors projects a sub-image onto a portion of the resin pool 14, and the composite image comprises a plurality of sub-images arranged in an array. In some examples, a display subsystem 26 is configured to detect a feature 28 on the application-specific substrate 18 from the image data and estimate a position and an orientation of the feature 28 on the application-specific substrate 18 relative to the camera 20. The display subsystem 26 is configured to operatively control each image projector 24 of the plurality of image projectors to adjust properties and alignment of a position of each sub-image in the array based on the estimated position and the estimated orientation of the feature 28. The display subsystem 26 includes a real-time processor or controller 48, which may be the system controller 48 or a portion thereof, and one or more graphics processing units (GPU) 50. As used herein, the controller 48 may refer to any suitable processing unit, computer, microcontroller, or processor configured to execute instructions, manage data, and control one or more components of the system. The GPU 50 may be configured to render visual data, perform image processing tasks, or support real-time feedback and visualization related to the printing process.

Figure 1B:
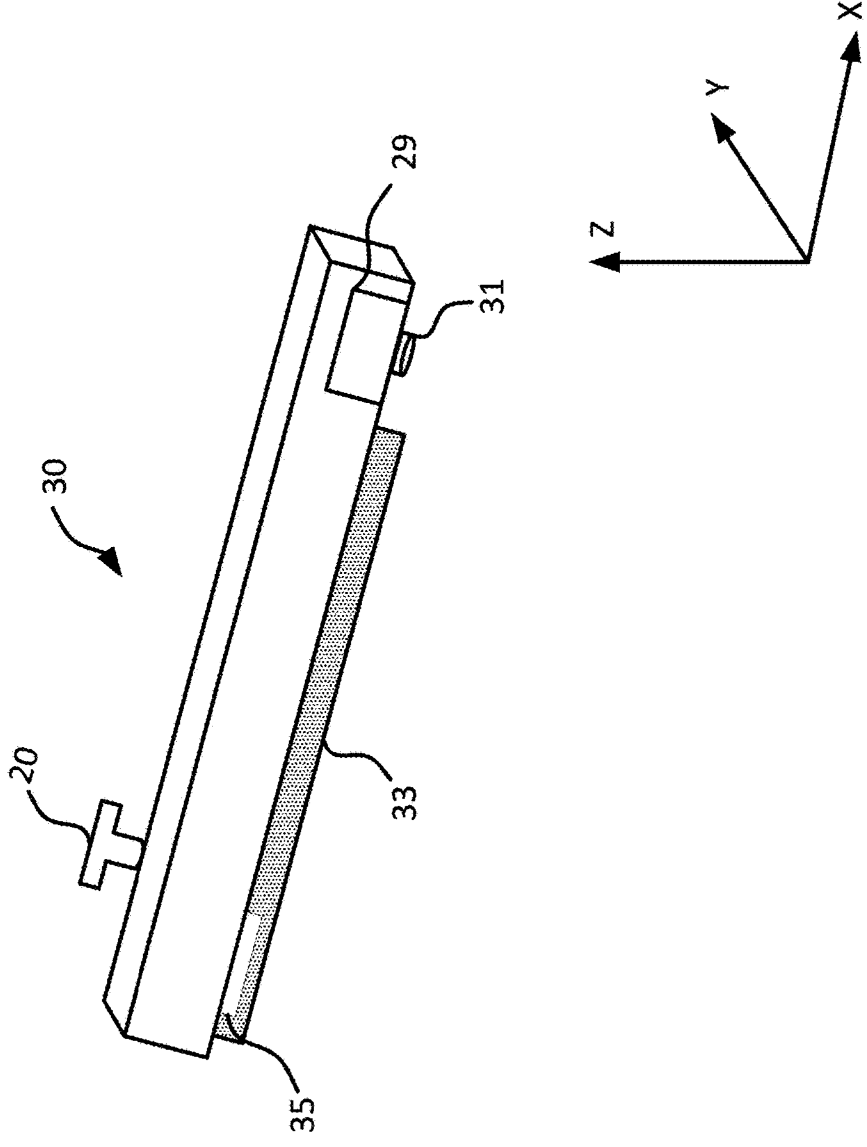
FIG. 1B is a perspective view of a recoater system of the PRPS, in accordance with some aspects.

FIG. 1B is a perspective view of a recoater system of the PRPS, in accordance with some aspects. The PRPS 10 may include a recoater system 30 coupled to linear motors 32 positioned above the vat 12. The recoater system 30 distributes resin across the build area during recoating processes, ensuring that an approximately uniform layer of resin is deposited over the previously solidified layer before the subsequent layer is exposed. The recoating process can be accomplished through various methods but commonly includes a blade sweeping (or scanning) along one axis of the application-specific substrate. The intended result is a consistent resin level across the entire pattern. Deviation in the resin thickness above or below the previously printed layer before the following layer exposure may result in print defects, and the recoater system 30 may reduce the occurrence and/or severity of such defects.

The recoater system 30 includes a carriage 29 configured to move along X, Y, and Z axes. A sensor 31 (or sensor cluster) is coupled to the carriage 29 and configured to detect a deviation on a top resin surface. A blade 33 is coupled to the carriage 29 and configured to mechanically level the resin by removing excess material from raised areas and spreading resin into lower areas. A doser 35 is also coupled to the carriage 29 and configured to dispense resin in a controlled manner to fill indented regions or correct uneven areas on the top resin surface. Leveling techniques of the recoater system, as described in U.S. Pat. No. 12,370,743, owned by the assignee of the present application and incorporated by reference herein, may be used to level the recoater system 30 in the X, Y, and Z axes.

In some aspects, the camera 20 may be optionally coupled to the recoater system 30. As the recoater system 30 moves along the X, Y, and Z axes, the camera 20 may view only a portion of the application-specific substrate 18 at a time, scanning it in sections rather than capturing the entire application-specific substrate 18 in a single view. This may be advantageous depending on the application. The camera 20 captures image data and transmits this data and associated information for processing. Alternatively, in some aspects, a sensor such as a capacitive sensor, inductive sensor, array sensor, point sensor, laser displacement sensor, touch probe, ultrasonic sensor, infrared sensor, piezoelectric sensor, or optical proximity sensor may be used in place of the camera 20.

Figures 2A, 2B:
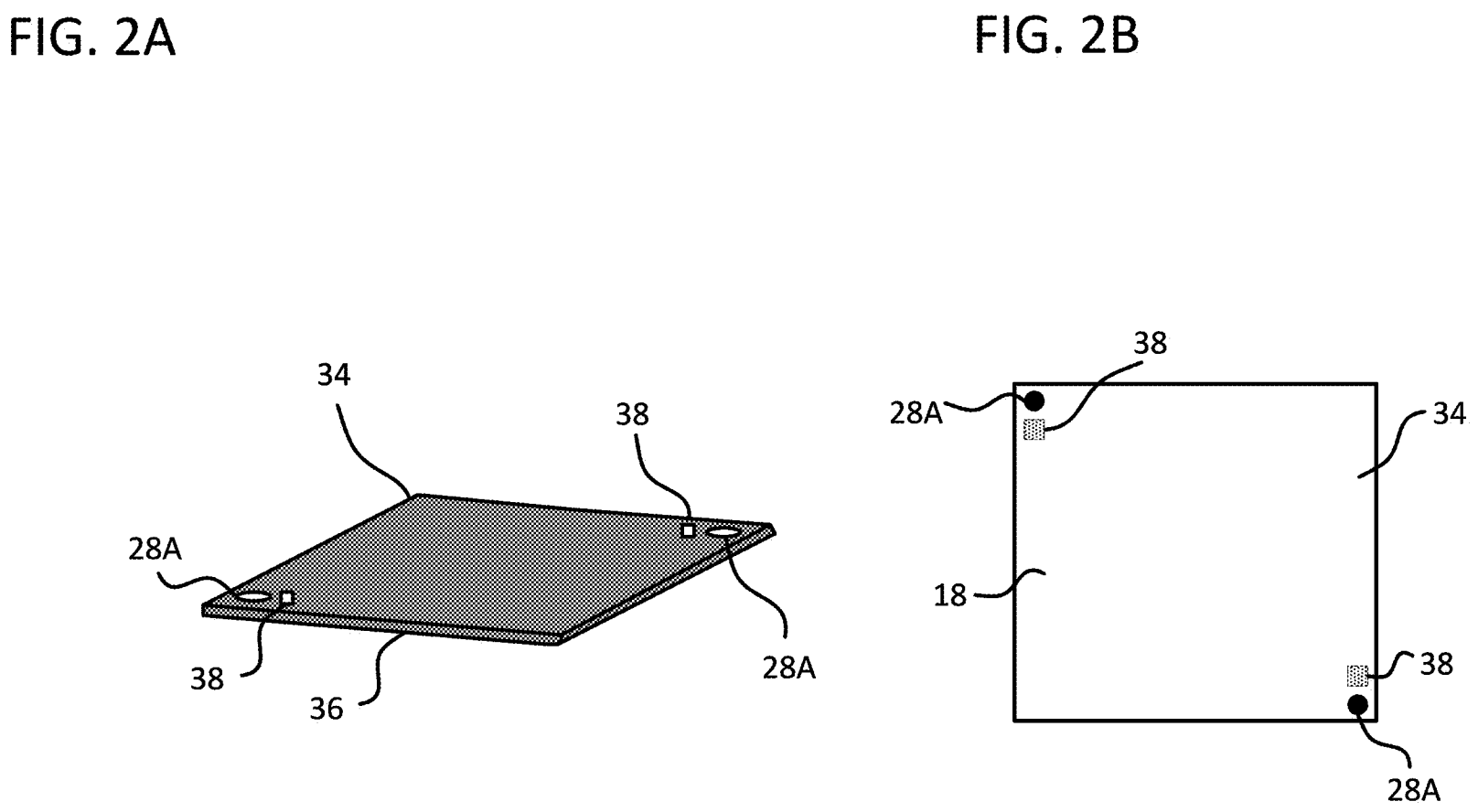
Figure 2C:
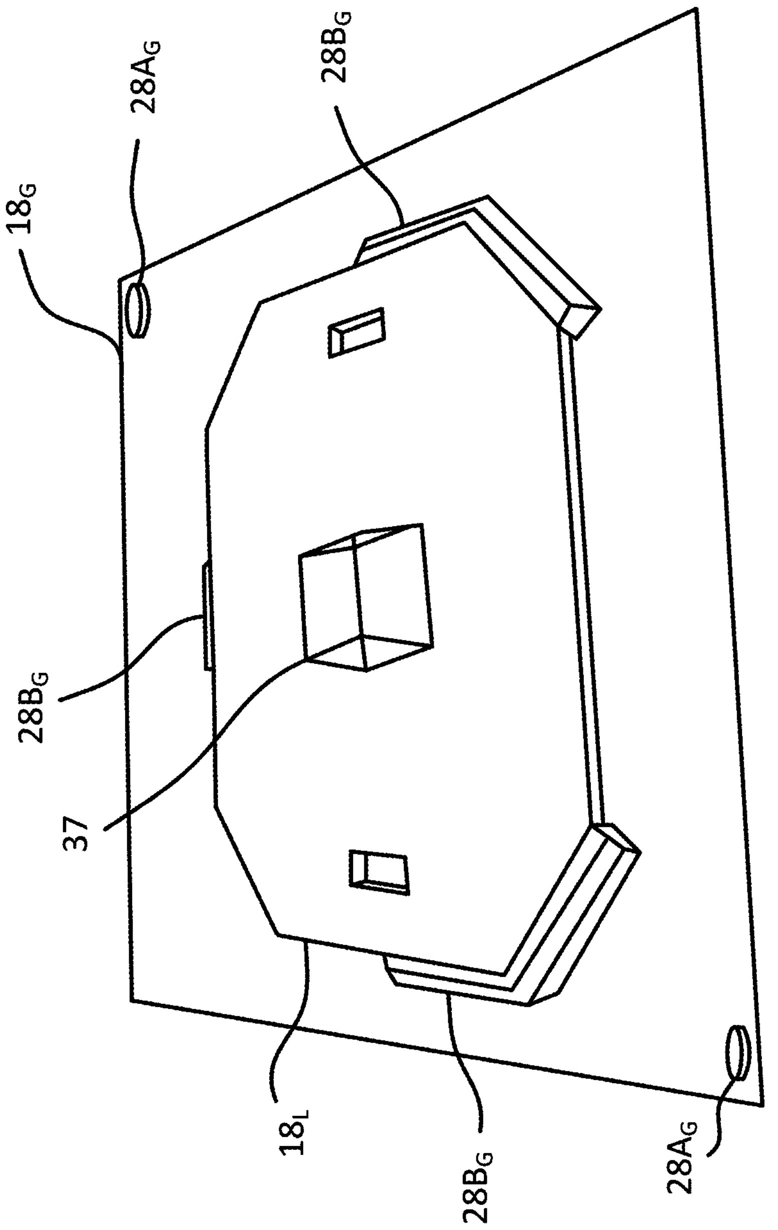
FIG. 2C is a perspective view of features on an application-specific substrate, in accordance with some aspects.

FIG. 2A is a perspective view of an example of an application-specific substrate, and FIG. 2B is a top view of the example of the application-specific substrate, both in accordance with some aspects. An application-specific substrate 18 refers to the surface or base upon which content is printed or to which content is added during the printing process. In some examples, the application-specific substrate 18 is instead a "global substrate" $\mathbf{18}_G$ (FIG. 2C) that functions as the build surface but in some examples, may not be incorporated into the final product. In such cases, the global substrate $\mathbf{18}_G$ may be reused across multiple print jobs. In other examples, the application-specific substrate 18 and the printed content are both incorporated into the finished product, with the application-specific substrate remaining as an integral component after printing. In certain examples, the application-specific substrate 18 itself comprises the printed content, such that the final product is formed entirely through the printing process.

The application-specific substrate 18 is illustrated as a flat, planar plate. It serves as the foundation for the initial layers of printed content to adhere to, providing a stable and level surface that supports accurate and consistent layer deposition throughout the printing process. Application-specific substrate 18 may be any shape such as circular, oval, square, rectangular, octagonal, or the like, and may be comprised of wood, aluminum, steel, a composite material, or glass, selected based on product-specific requirements. In some examples, the application-specific substrate 18 may be a build tray of the PRPS 10. In some examples, the application-specific substrate 18 itself may be 3D printed of resin materials. Application-specific substrates 18 are sized depending on the application. For circular application-specific substrates 18, a diameter may range from 25 cm or less, 25 cm to 51 cm, 48 cm to 53 cm, or greater than 51 cm. For rectangular application-specific substrates 18, in some examples, a length and a width of the application-specific substrate 18 may range from 7 cm to 13 cm or less, 30 cm by 36 cm, 14 cm by 22 cm, 35 cm by 71 cm, or larger. It will be understood that any suitable size may be used, depending on the design and operational requirements.

The application-specific substrate 18 has a first side 34 (e.g., top surface or top side) and a second side 36 (e.g., bottom surface or bottom side). In some aspects, the first side 34 of the application-specific substrate 18 may have an identification mark 38 or a plurality of identification marks located away from where the 3D printing will occur such as in one or more corners. Each identification mark 38 represents information that is machine-readable or scannable, and may be a barcode, data matrix code, quick response (QR) code, or similar encoding method. It can be used to identify a serial number associated with the application-specific substrate 18, track information, and/or distinguish between the first side 34 and the second side 36 of the application-specific substrate 18.

The application-specific substrate 18 may include a feature 28, which is a detectable characteristic used during the printing process to assist with alignment, positioning, or process control. In some examples, the feature 28 may be a fiducial mark 28A, at least one fixture element 28B, or a defined portion 28C of the application-specific substrate 18. As used herein, the term "feature 28" refers generally to any such detectable characteristic, while references to 28A, 28B and 28C identify specific types of features.

In one example, the feature 28 is the fiducial mark 28A or a plurality of fiducial marks which are reference points or patterns placed on the application-specific substrate 18 to aid in the accurate measurement and alignment of the image projection system 22. These may be specially designed patterns or shapes placed in known locations and positioned away from the area where the 3D printing will take place. In some aspects, the fiducial mark 28A is at least one of an individual circular dot, checkerboard pattern, circular dots pattern, ArUco marker, ChArUco marker, image, tag AprilTag, QR code, barcode, dot matrix code, dot peen marking or aperture. For example, the fiducial mark 28A may be a circular dot or a grouping of circular dots where each dot has a diameter of 2 mm to 25 mm.

FIG. 2C is a perspective view of features on an application-specific substrate, in accordance with some aspects. In some examples, the feature 28 may be at least one fixture element 28B, such as mounting or holding structures, for positioning and alignment of printed content or a second application-specific substrate. As used herein, the term "fixture elements 28B" refers collectively to one or more such elements. The fixture elements 28B may be 3D printed on a first application-specific substrate referred to as a "global" substrate $\mathbf{18}_G$. In this disclosure, a "G" may be appended to reference labels to indicate that a component is associated with the global substrate, while an "L" may be appended to indicate association with a local application-specific substrate.

In this disclosure, the global substrate 18$_G$ may be an application-specific substrate 18 or may serve as the build plate of the PRPS 10. In some examples, the global substrate 18$_G$ functions solely as a support surface during printing and is not incorporated into the finished product. In such cases, it may be reused in subsequent print jobs. In other examples, the global substrate 18$_G$ remains as part of the finished product, contributing to its structural or functional characteristics. In contrast, the application-specific substrate 18 is incorporated into the finished product following the printing process. The application-specific substrate 18 may be fabricated through printing or may be a preexisting component to which additional content is applied. When a global substrate 18$_G$ is used for positioning or support, the application-specific substrate 18 is referred to as a local application-specific substrate 18$_L$ to distinguish its role within the printing system.

The fixture elements 28B$_G$ on the global substrate 18$_G$ can hold and accurately align a local application-specific substrate 18$_L$ to allow the system to 3D print content on the local application-specific substrate 18$_L$ in a precise manner. In some aspects, the fixture elements 28B$_G$ are printed directly on the global substrate 18$_G$, and a blank, local application-specific substrate 18$_L$ is inserted between the fixture elements 28B$_G$ for alignment. Put another way, before positioning the local application-specific substrate 18$_L$, at least one fixture element 28B$_G$ may be printed on a global substrate 18$_G$. Subsequently, content 37 is 3D printed onto the local application-specific substrate 18$_L$. The global substrate 18$_G$ may include other features 28 such as fiducial marks 28A$_G$.

In other examples, the local application-specific substrate 18$_L$ and the content on the local application-specific substrate 18$_L$ are 3D printed simultaneously between the fixture elements 28B$_G$ on the global substrate 18$_G$. In some examples, the fixture elements 28B may be 3D printed on a hollow application-specific substrate such as on the "frame" (the frame example shown in FIGS. 4A-4D). In any of these examples, 3D printing of the fixture elements 28B$_G$ directly onto the global substrate 18$_G$ beneficially enables accurate printing of the content since the fixture elements 28B$_G$ serve as a fixture which accurately aligns the local application-specific substrate 18$_L$.

In another example, the application-specific substrate 18 is a medical implant base, and the feature 28 includes fixture elements 28B used to align the implant during the printing process. These fixture elements 28B remain part of the finished product and may serve secondary functions such as aiding in surgical placement, providing structural reinforcement, or integrating with surrounding anatomical features.

Figures 2D, 2E:
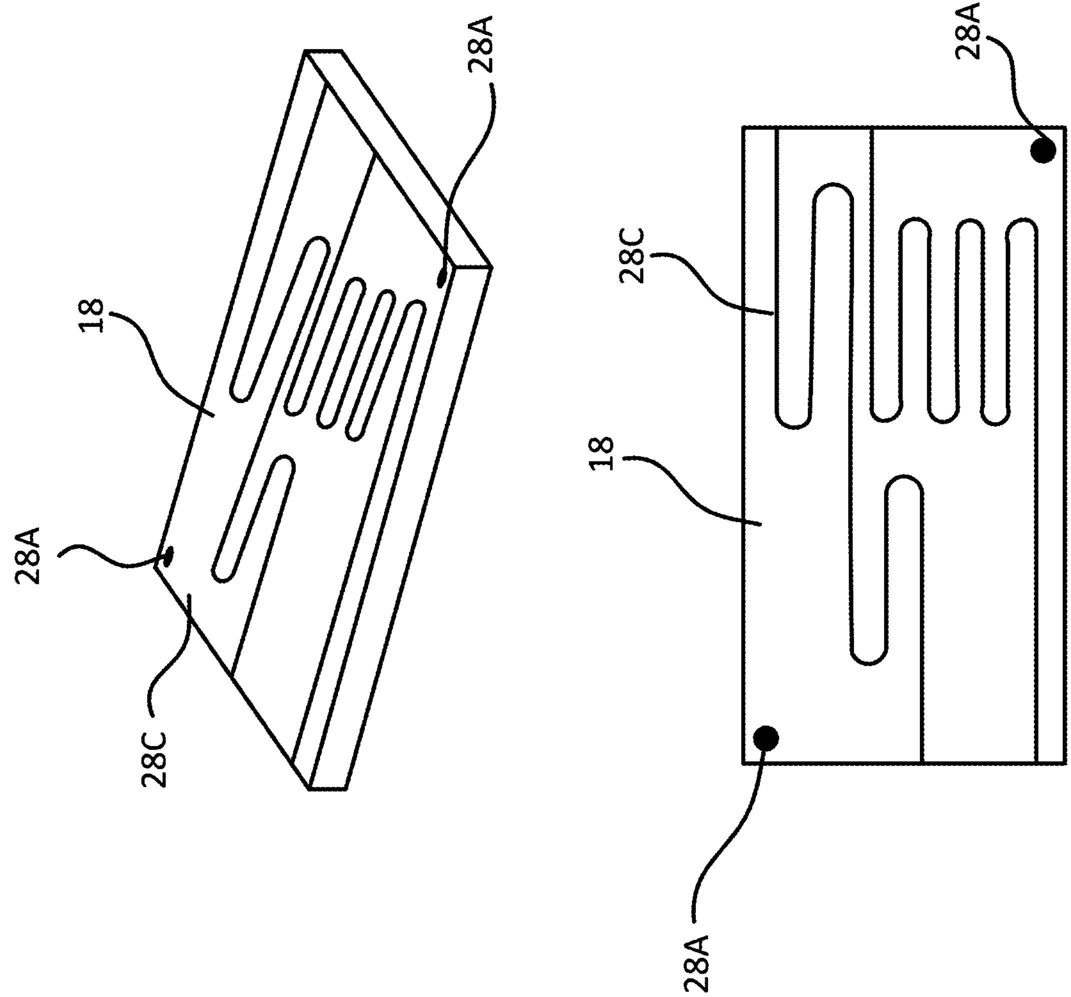
FIG. 2D is a perspective view of features on an application-specific substrate, in accordance with some aspects.
FIG. 2E is a top view of features on an application-specific substrate, in accordance with some aspects.

FIG. 2D is a perspective view of features on an application-specific substrate, and FIG. 2E is a top view of features on an application-specific substrate, both in accordance with some aspects. In some examples, the feature 28 is integrally part of the application-specific substrate 18 before 3D printing and is incorporated in the finished product after printing of the content. In such cases, the feature 28 is a defined portion 28C of the application-specific substrate 18. In this example, the application-specific substrate 18, as received and before printing, includes channels formed throughout its structure. These channels may serve a variety of purposes, including fluid transport in microfluidic applications, gas flow regulation, thermal management using liquid or gas cooling, electrical isolation pathways, or routing for optical fibers or embedded sensing elements. The presence of these channels allows the application-specific substrate 18 to serve not only as a structural base for printing but also as an active or functional component of the final product. One or more of these channels may serve as the defined portion 28C, which functions as a feature 28 used to facilitate alignment of the additional printed content during the printing process. In addition to the defined portion 28C, the application-specific substrate 18 may also include other features 28, such as fiducial marks 28A or fixture elements 28B, which assist with positioning or process control during printing.

In another example, the application-specific substrate 18 may be a printed circuit board (PCB) containing pre-formed vias, traces, or embedded channels for electrical connections. In this case, the defined portion 28C may be a set of alignment notches, registration holes, or conductive pads that are integrally part of the PCB. These defined portions 28C may be used to align the PRPS 10 for precise deposition of additional content, such as solder masks, conformal coatings, or component supports. Both the application-specific substrate 18 and the added content become part of the finished part. In another example, the application-specific substrate 18 may be a molded or machined structure designed to house optical sensing components. The defined portion 28C may include pre-formed grooves or reference edges used to align lenses, filters, or printed waveguides. During 3D printing, the PRPS 10 uses these features for precise placement of optical layers or alignment features. The application-specific substrate 18 and printed optical elements together form the final product, such as a sensor module.

The features 28 such as a fiducial mark 28A, the fixture elements 28B, or a defined portion 28C of the application-specific substrate 18, are used during the printing process. The feature 28 may be recognized by a device such as the camera 20, sensor or the like, and the device transmits the information to be processed. The processed data is used to calibrate and control the image projection system 22. In some aspects, the identification mark 38 and the feature 28 (e.g., fiducial mark 28A) may be combined into one mark which serves both purposes of information and alignment.

In some aspects, the application-specific substrate 18 may have a textured or an etched surface to create a tactile effect. This promotes mechanical adhesion between the 3D printed content and the application-specific substrate 18 when printing on the application-specific substrate 18. The texturizing may be achieved through various methods such as embossing, molding, coating, or etching. The texture may include raised or protruding patterns, grooves or indentations, bead blasting effect, or a grainy or pebbled effect. Etching can be performed using various techniques such as chemical etching, laser etching, or mechanical tools, for removing material to create recessed areas on the surface of the application-specific substrate 18 and resulting in a distinct texture. Functional structures created through etching may include channels, grooves, or microstructures designed to enhance adhesion.

FIGS. 3A-3D are top views of a blank application-specific substrate with a plurality of through holes prior to the addition of any 3D printed content, all in accordance with some aspects. In some cases, the application-specific substrate 18 includes a plurality of through holes 40 or perforations. Each through hole 40 extends from the first side 34 of the application-specific substrate to the second side 36 of the application-specific substrate 18, allowing resin to pass through efficiently. The through holes 40 facilitate the quick transfer of resin between the first side 34 and the second side 36 when the application-specific substrate 18 is submerged into or removed from the resin pool 14 in the vat 12. This mechanism enables resin to flow from underneath the application-specific substrate 18 to the top surface of the application-specific substrate 18 where the 3D printing will occur and may also prevent resin from spilling over the edges and flooding the application-specific substrate 18, ensuring a controlled and clean process.

Figures 3A, 3B, 3C, 3D:
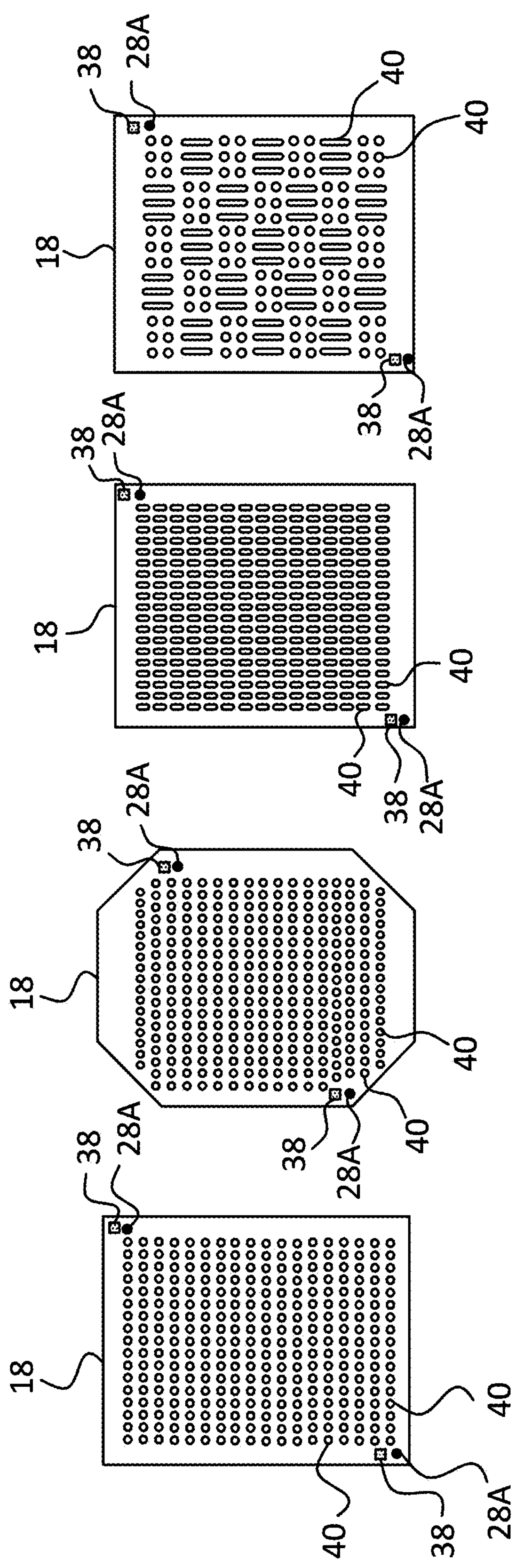
FIGS. 3A-3D are top views of a blank application-specific substrate with a plurality of through holes prior to the addition of any 3D printed content, all in accordance with some aspects.

The through holes 40 on the application-specific substrate 18 may be uniformly sized, vary in size, or combinations thereof. They can be arranged in a uniform, consistent pattern, a random pattern, or combinations thereof. The through holes 40 may be various shapes, including circular, oval, square, rectangular, diamond, or other geometries. In some aspects, each through hole 40 may range in area from 2.0 mm to 9.0 mm such as 6.0 mm to 6.5 mm. Additionally, the through holes 40 can be distributed randomly, grouped, densely spaced, or broadly spaced, with varying diameters or combinations thereof. FIG. 3A shows an example of a rectangular application-specific substrate 18 with circular through holes 40 all the same size in a uniform pattern. FIG. 3B depicts an example of an octagonal application-specific substrate 18 with circular through holes 40 all the same size in a uniform pattern. FIG. 3C shows an example of a rectangular application-specific substrate 18 with oval (e.g., slots) through holes 40 all the same size in a uniform pattern. FIG. 3D is an example of a rectangular application-specific substrate 18 with a mix of circular and oval through holes 40 of varying sizes in a uniform pattern.

Figure 4A:
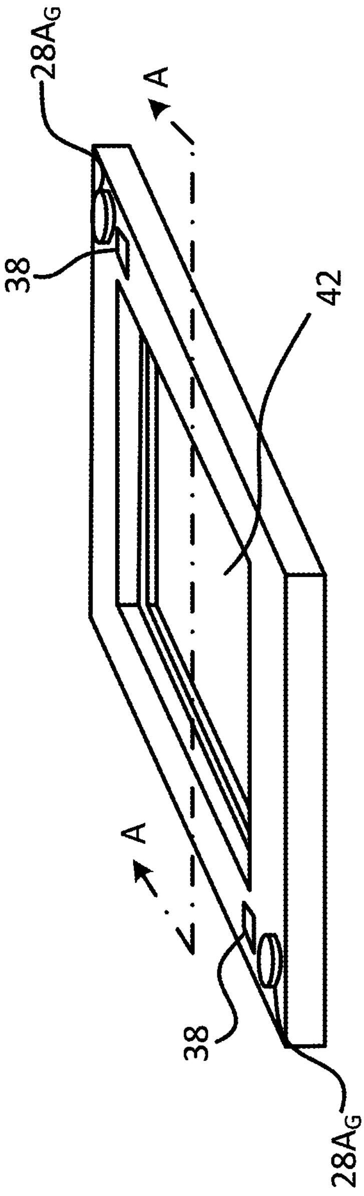
FIG. 4A is a perspective view of a hollow global substrate, in accordance with some aspects.
Figure 4B:
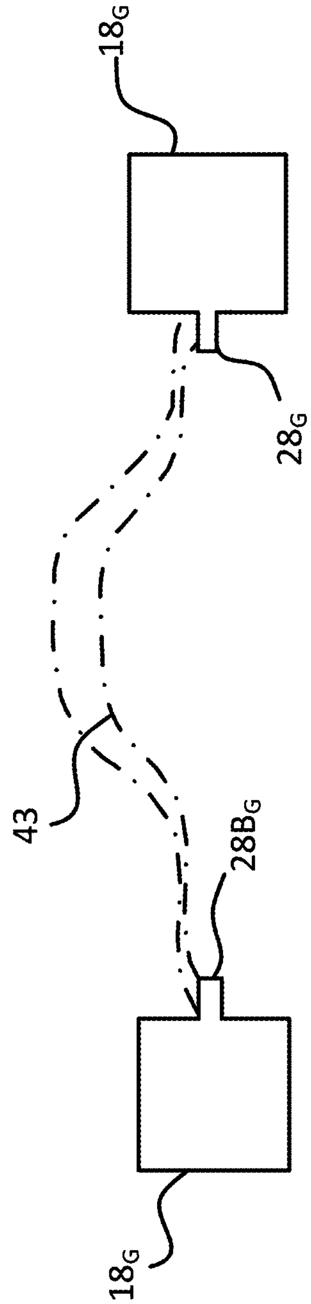
FIGS. 4B-4D are cross-sectional views of the hollow global substrate of FIG. 4A along cutline A-A, all in accordance with some aspects.
Figure 4C:
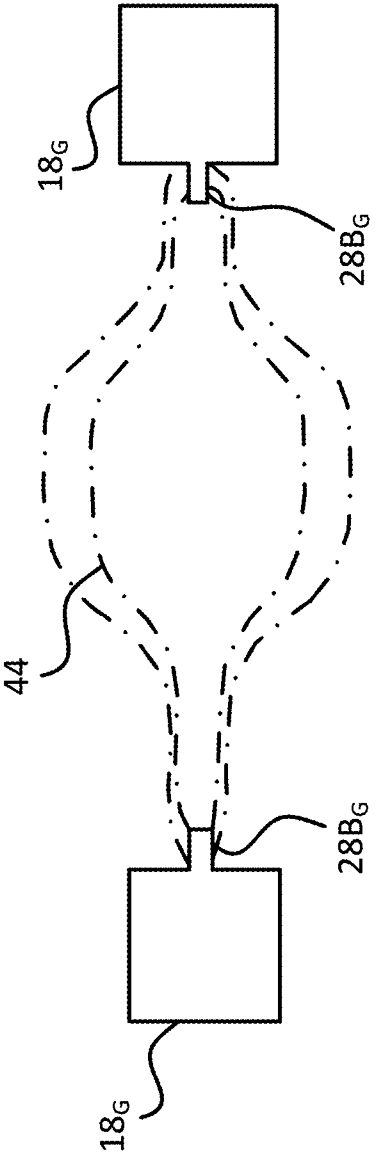
Figure 4D:
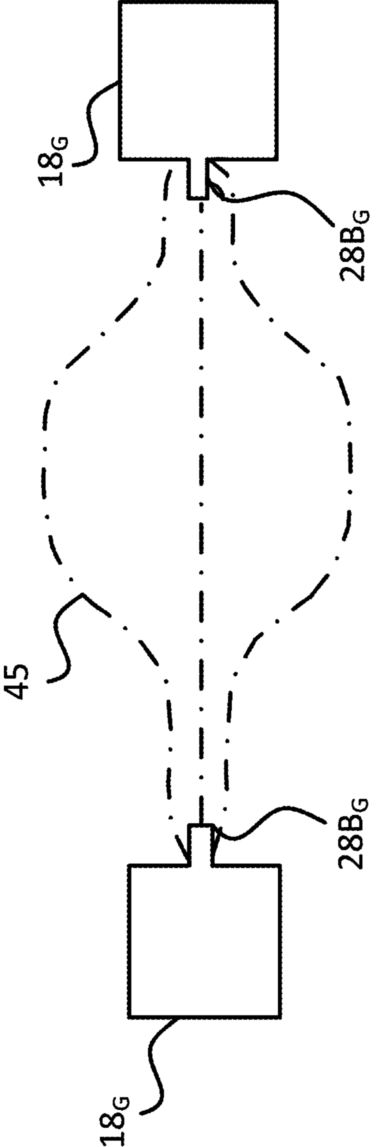

FIG. 4A is a perspective view of a hollow global substrate, in accordance with some aspects. In some examples, the global substrate $\mathbf{18}_G$ may be a hollow geometric shape with an open interior such that there is empty space 42 in the center of the shape. In the example shown of FIG. 4A, the global substrate $\mathbf{18}_G$ s a hollow rectangular shape creating a frame-like appearance. Other shapes may be used such as square, octagon, or the like. The global substrate $\mathbf{18}_G$ may include identification marks 38 and fiducial marks $\mathbf{28}A_G$. FIGS. 4B-4D are cross-sectional views of the hollow global substrate of FIG. 4A along cutline A-A, all in accordance with some aspects. The interior of the global substrate $\mathbf{18}_G$ may include fixture elements $\mathbf{28}B_G$ such as extending from a side of the global substrate $\mathbf{18}_G$ toward the empty interior space. The fixture elements $\mathbf{28}B_G$ may be an attachment point allowing a 3D printed part to be created within the empty space of the global substrate $\mathbf{18}_G$ and securely attached to these points.

FIG. 4B shows the 3D printed part 43 on the hollow global substrate $\mathbf{18}_G$ in the empty space 42 and attached to the fixture elements $\mathbf{28}B_G$. FIG. 4C illustrates the 3D printed part 44 as a "shell" structure in the empty space 42 of the hollow global substrate $\mathbf{18}_G$ and attached to the fixture elements $\mathbf{28}B_G$. FIG. 4D, on the other hand, depicts the 3D printed part 45 as a "solid" structure, similarly printed in the empty space 42 of the hollow global substrate $\mathbf{18}_G$ and secured to the fixture elements $\mathbf{28}B_G$.

Additive manufacturing systems and methods may be used to create application-specific substrates 18 and content on the application-specific substrates 18. Referring to FIG. 1A, the additive manufacturing system is a PRPS 10 and includes an image projector system 22 that projects light (e.g., ultraviolet light) corresponding to a polymerization wavelength of the resin. In some examples, the image projector system 22 has multiple image projectors 24. The image projection system 22 can project a composite image onto a surface of a resin pool 14 where the application-specific substrate 18 is submerged in the resin pool 14. In some examples, the image projection system 22 contains an image projector 24 or a plurality of image projectors, and the composite image contains a plurality of sub-images arranged in an array, where each of the image projectors 24 projects a sub-image onto the surface of a resin pool 14. A camera 20 captures and transmits image data from the application-specific substrate 18 to a display subsystem 26. The display subsystem 26 uses this information to operatively control each image projector 24 of the plurality of image projectors. The display subsystem 22 controls the image content. Instead of mechanically moving or repositioning the image projectors 24, the system adjusts the image data being displayed.

The PRPS 10 is used to 3D print, in some examples, the application-specific substrate 18, the features 28 (fiducial mark 28A and/or the fixture elements 28B), and content onto application-specific substrate 18. In some examples, only content is printed on the application-specific substrate 18 (e.g., without features 28). In some examples, the application-specific substrate 18 is first printed then content is printed onto the application-specific substrate 18. In some examples, the application-specific substrate 18 and content are printed at the same time. In some examples, fixture elements $\mathbf{28}B_G$ are printed on a global substrate $\mathbf{18}_G$, a local application-specific substrate $\mathbf{18}_L$ is inserted into the fixture elements $\mathbf{28}B_G$, then content is printed onto the local application-specific substrate $\mathbf{18}_L$. In some examples, fixture elements $\mathbf{28}B_G$ are printed on a global substrate $\mathbf{18}_G$, then a local application-specific substrate $\mathbf{18}_L$ and content are printed onto the global substrate $\mathbf{18}_G$. In all of these examples, the local application-specific substrate $\mathbf{18}_L$ is incorporated in a finished product after printing.

Figures 5A, 5B:
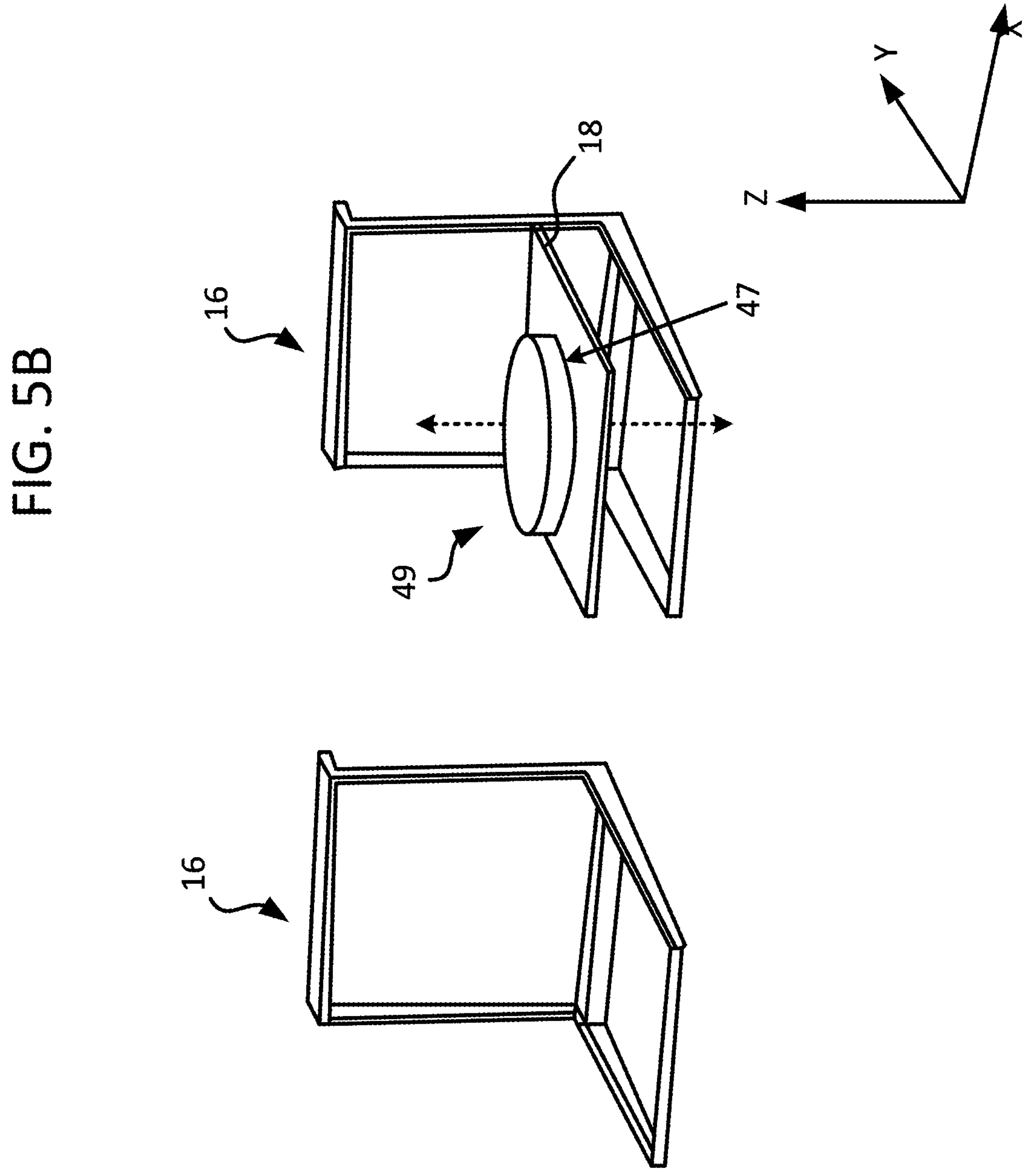
FIGS. 5A and 5B are perspective views of a holding device, both in accordance with some aspects.

FIGS. 5A and 5B are perspective views of a holding device, both in accordance with some aspects. In some examples, the forks 16 may be elevator arms and are configured to hold and/or support the application-specific substrate 18. In some examples, the forks 16 mechanically couples to the application-specific substrate 18 using cam-locks, clamps, vices, fasteners, or other means. In other examples, the application-specific substrate 18 is supported by being placed into a recessed channel of the forks 16. The forks 16 are configured to move vertically (in the z-direction), allowing the application-specific substrate 18 to be lowered into the resin pool 14 of the vat 12 for printing of the content. Subsequently, the forks 16 are lifted with the application-specific substrate 18 and the attached content out of the resin pool 14. In some examples, the dimensions of the forks 16 can be customized to accommodate the size of the application-specific substrate 18 being used. FIG. 5B illustrates the application-specific substrate 18 with content 47 being placed into the forks 16 or removed from the forks 16, as indicated by the arrows. In this example, the finished product 49 is the application-specific substrate 18 and the content 47.

Figures 6A, 6B:
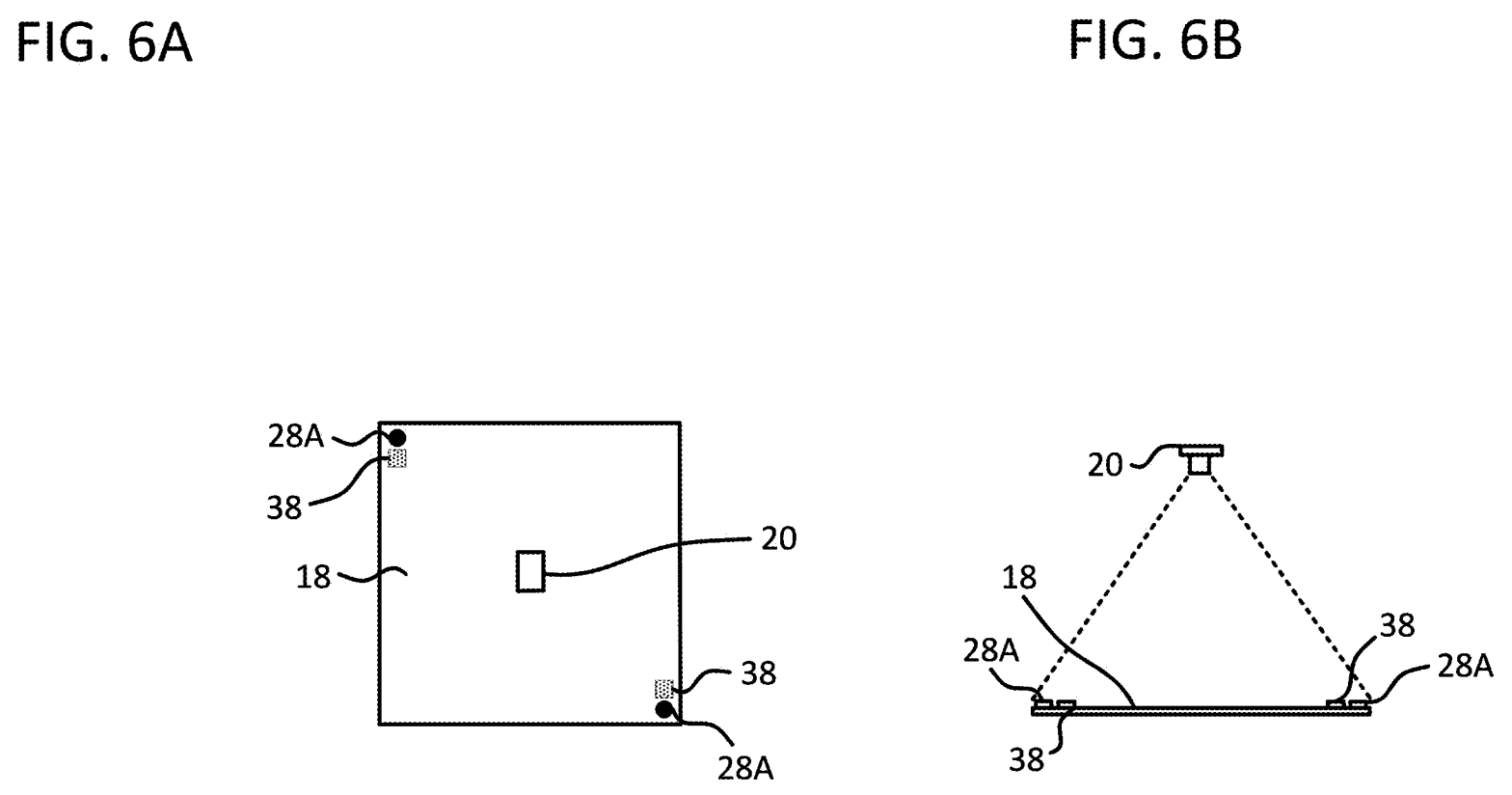

As shown in FIG. 1A, an imaging device such as a camera 20 or in some examples, a sensor, is positioned above the application-specific substrate 18, and configured to capture and transmit image data from the application-specific substrate 18, and specifically, the features 28 and identification mark 38, if present. In some examples, the camera 20 is positioned above the application-specific substrate 18 to provide a "bird's-eye view," capturing a comprehensive overview of the entire build area while remaining stationary. FIG. 6A is a top view of the camera positioned above the application-specific substrate, and FIG. 6B is a side view of the camera positioned above the application-specific substrate 18, both in accordance with some aspects. In other examples, the camera 20 is positioned to capture only a portion of the application-specific substrate 18, in which the camera 20 may be moved to collect images of the entire application-specific substrate 18. For example, the camera 20 may be positioned on the recoater system 30. In further examples, the camera 20 may be positioned in different locations within the system and use mirrors to capture image data indirectly.

The image projection system 22 (also referred to as illumination system) is positioned above the vat 12 and separated from the camera 20 to ensure that the camera 20 does not obstruct the light projection paths emitted by the image projection system 22. The image projection system 22 comprises one or more image projectors 24, such as a plurality of image projectors. The image projection system 22 is configured to project a composite image onto a surface of the resin pool 14. Each image projector 24 of the plurality of image projectors projects a sub-image onto a portion of the resin pool 14, and the composite image comprises a plurality of sub-images arranged in an array. The intended image projected onto the build area may be referred to as the ideal composite image. Various issues can cause a composite image to be distorted compared to the ideal composite image. In some aspects, the PRPS 10 further includes a calibration fixture containing a plurality of sets of light sensors (not shown). Each set of light sensors in the calibration fixture can be used to monitor a projected sub-image in a composite image. The properties of each sub-image and the alignment of the position of each sub-image within the composite image can then be adjusted using feedback from the plurality of sets of light sensors in the calibration fixture. Calibration techniques and digital filters, such as described in the '743 U.S. Patent incorporated herein, may be used to adjust an image (or sub-image) projected.

The image projection system 22 may include four image projectors 24 configured to project four sub-images to form a single composite image on the application-specific substrate 18. In other aspects, the image projection system 22 of the PRPS 10 may include more or fewer image projectors 24 than those shown depending on the size of the print job. The image projection system 22 projects a first image into the resin pool 14 that is confined within the resin vat 12. The build area is the area where the resin is exposed (e.g., to ultraviolet light from the image projection system) and crosslinks to form a first solid polymer layer on the application-specific substrate 18. Some examples of resin materials include acrylates, epoxies, methacrylates, urethanes, silicone, vinyls, combinations thereof, or other photoreactive resins that crosslink upon exposure to illumination.

Different photoreactive polymers have different curing times. Additionally, different resin formulations (e.g., different concentrations of photoreactive polymer to solvent, or different types of solvents) have different curing times. In some examples, the resin has a relatively short curing time compared to photosensitive resins with average curing times. In some examples, the resin is photosensitive to wavelengths of illumination from about 200 nm to about 500 nm, or to wavelengths outside of that range (e.g., greater than 500 nm, or from 500 nm to 1000 nm). In some examples, the resin forms a solid with properties after curing that are desirable for the specific pattern being fabricated.

After exposure of the first layer, the forks 16 move the application-specific substrate 18 downwards (i.e., in the negative z-direction as shown in FIG. 1A), and a second layer can be formed by exposing a second image projected from the image projection system 22. This "top down" process can then be repeated until the entire content is printed on the application-specific substrate. The application-specific substrate 18 with the content is then lifted out of the resin pool 14 by the forks 16. The content and the application-specific substrate are incorporated in or become a finished product after the printing.

In some examples, the image projection system 22 emits radiant energy (i.e., illumination) over a range of different wavelengths, for example, from 200 nm to 500 nm, or from 500 nm to 1000 nm, or over other wavelength ranges. The image projection system 22 can use any illumination source that is capable of projecting an image. Some examples of illumination sources are arrays of light emitting diodes, liquid crystal based projection systems, liquid crystal displays (LCDs), liquid crystal on silicon (LCOS) displays, mercury vapor lamp-based projection systems, digital light processing (DLP) projectors, discrete lasers, and laser projection systems.

The display subsystem 26 is configured to detect features 28 if present on the application-specific substrate 18 from the image data. For example, the display subsystem 26 may use computer vision algorithms to detect the features 28 (e.g., fiducial mark 28A, fixture elements 28B, and/or defined portion 28C) in the captured image. For the fiducial marks 28A, this technique may include converting the image to grayscale and applying thresholding to enhance the fiducial marks 28A, finding contours in the image that match the shapes of the fiducial marks 28A, and identifying the specific fiducial mark 28A based on its unique pattern or identification. For the fixture elements 28B and defined portion 28C, this technique may include converting the image to grayscale and applying thresholding to enhance the fixture elements 28B or defined portion 28C. Once the features 28 are detected, their coordinates are extracted. These coordinates are used to compute a translation and rotation matrix, which the display subsystem 26 utilizes for precise and accurate placement of the layer images to be printed on the application-specific substrate 18.

A transformation matrix is generated by controller 48 to map the detected features 28 in the image to a reference coordinate system. This matrix defines the position, rotation, and scale of the feature 28 in the image. The transformation matrix may be computed by calculating both the rotation and translation needed to align the points. A translation matrix shifts points from one location to another in the coordinate system, and a rotation matrix rotates points around an origin. The translation matrix and the rotation matrix may be combined into a single transformation matrix.

Using the transformation matrix, the display subsystem 26 calculates the real-world coordinates where the sub-image (or composite image) needs to be placed on the application-specific substrate 18 relative to the feature 28. The display subsystem 22 controls the image projection system 22 (e.g., each image projector 24) to adjust the sub-image's position based on the calculated coordinates. This adjustment may involve repositioning the sub-image to the correct X, Y, and Z coordinates, aligning it with the desired orientation, and ensuring its size is appropriate if necessary. Accordingly, the controller 48 of the display subsystem 26 of the PRPS 10 estimates a position and an orientation of the feature 28 on the application-specific substrate 18 relative to the camera 20. Then, the controller 48 of the display subsystem 26 is configured to operatively control each image projector 24 of the plurality of image projectors of the PRPS 10 to adjust properties and alignment of a position of each sub-image in the array based on the position and the orientation of the feature 28.

In some aspects, alternatives to camera imaging may be used to initialize translation and rotation matrix routines. For example, acoustics or LIDAR may be employed in place of imaging to provide the necessary spatial input.

Figure 7:
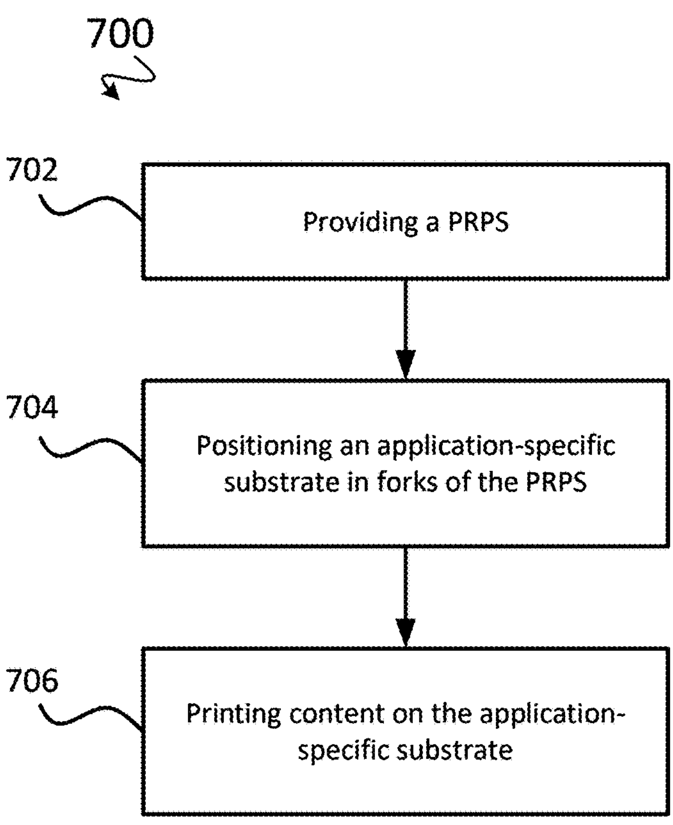
FIG. 7 is a flowchart for a method for 3D printing on an application-specific substrate, in accordance with some aspects.

FIG. 7 is a flowchart for a method for 3D printing on an application-specific substrate, in accordance with some aspects. The particular steps, order of steps, and combination of steps are shown for illustrative and explanatory purposes only. Other examples can implement different particular steps, orders of steps, and combinations of steps to achieve similar functions or results. In some examples, content is 3D printed on application-specific substrate 18. A method 700 begins at block 702 where the PRPS 10 is provided. At block 704, an application-specific substrate 18 is positioned in forks 16 of the PRPS 10. At block 704, content is printed on the application-specific substrate 18. The content and the application-specific substrate 18 are incorporated in a finished product after the printing.

During the printing, the content may be aligned to a feature 28 on the application-specific substrate 18. The aligning includes detecting the feature 28 on the application-specific substrate 18 from image data from a camera 20. A controller 48 of the display subsystem 26 of the PRPS 10 estimates a position and an orientation of the feature 28 relative to the camera 20. The controller 48 of the display subsystem 26 of the PRPS 10 operatively controls an image projector 24 of the PRPS 10 to adjust properties and alignment of a position of the content based on the position and the orientation of the feature 28. In some examples, the feature 28 may be a fiducial mark 28A, at least one fixture element 28B or a defined portion 28C of the application-specific substrate 18 before the printing. These types of features 28 are described in detail elsewhere in this disclosure.

Figure 8:
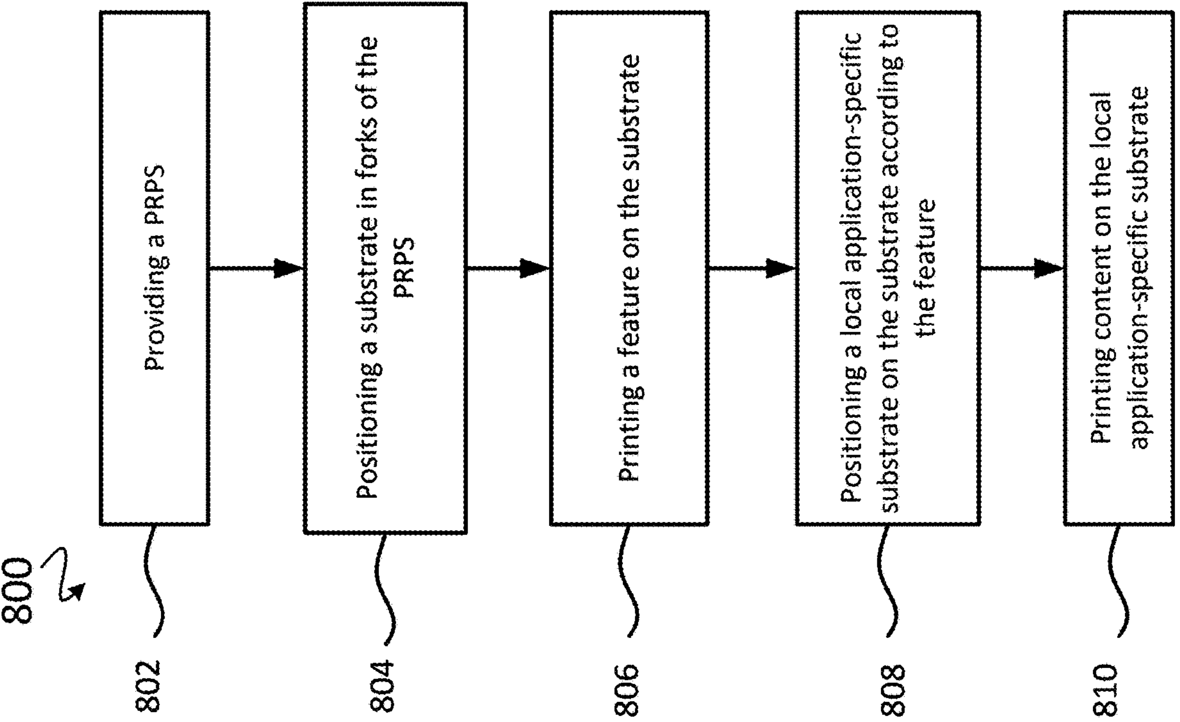
FIG. 8 is a flowchart for a method for 3D printing on an application-specific substrate, in accordance with some aspects.

FIG. 8 is a flowchart for a method for 3D printing on an application-specific substrate, in accordance with some aspects. The particular steps, order of steps, and combination of steps are shown for illustrative and explanatory purposes only. Other examples can implement different particular steps, orders of steps, and combinations of steps to achieve similar functions or results. As stated previously, a "G" may be appended to reference labels to indicate that a component is associated with the global substrate, while an "L" may be appended to indicate association with the application-specific substrate.

A method 800 begins at block 802 where a PRPS 10 is provided. At block 804, a global substrate 18$_G$ is positioned in forks 16 of the PRPS 10. At block 806, a feature 28 is printed on the global substrate 18$_G$. In this example, the feature 28 may be a fiducial mark 28A$_G$ or at least one fixture element 28B$_G$. At block 808, a local application-specific substrate 18$_L$ is positioned on the global substrate 18$_G$ according to the feature. In some examples, the positioning of the local application-specific substrate 18$_L$ comprises printing the local application-specific substrate 18$_L$ on the global substrate 18$_G$. At block 810, content is printed on the local application-specific substrate 18$_L$. The content and the local application-specific substrate 18$_L$ are incorporated in a finished product after the printing.

In one example, the global substrate 18$_G$ is not part of the finished product. Rather, the finished product includes the local application-specific substrate 18$_L$ and the content. A practical example of this may be a circuit board where the printed content may include conductive traces, insulating layers, or structural components directly integrated with the board. In another example, both the global substrate 18$_G$ and the local application-specific substrate 18$_L$ are incorporated into the finished product. For example, the product may be a modular sensor assembly, where the global substrate 18$_G$ serves as a mechanical frame or thermal spreader and the local application-specific substrate 18$_L$ and content supports electronic functionality.

In some examples, the global substrate 18$_G$ may be a second application-specific substrate 18, may serve as the build plate of the PRPS 10, or may be the build plate of the PRPS 10. The global substrate 18$_G$, along with the associated feature 28, may be reused in subsequent printing operations to support alignment and positioning of another local application-specific substrate 18$_L$. In one example, after the printing of the fixture element 28B$_G$, the global substrate 18$_G$ is positioned in the forks 16. Then, the local application-specific substrate 18$_L$ is positioned on the global substrate 18$_G$ relative to the fixture element 28B$_G$.

During the printing, the content is aligned to at least one of a feature 28 on the local application-specific substrate 18$_L$ or the global substrate 18$_G$. The aligning includes detecting the at least one feature 28 on the local application-specific substrate 18$_L$ or the global substrate 18$_G$ from image data from the camera 20. The controller 48 of the PRPS 10 estimates a position and an orientation of the least one feature 28 relative to the camera 20. The controller 48 operatively controls an image projector 24 of the PRPS 10 to adjust properties and alignment of a position of the content based on the position and the orientation of the at least one feature 28.

In some examples, the at least one feature 28 may be a fiducial mark 28A on the local application-specific substrate 18$_L$ or the global substrate 18$_G$, at least one fixture element 28B on the local application-specific substrate 18$_L$ or the global substrate 18$_G$, or a defined portion 28C of the local application-specific substrate 18$_L$. These types of features are described in detail elsewhere in this disclosure.

Figure 9:
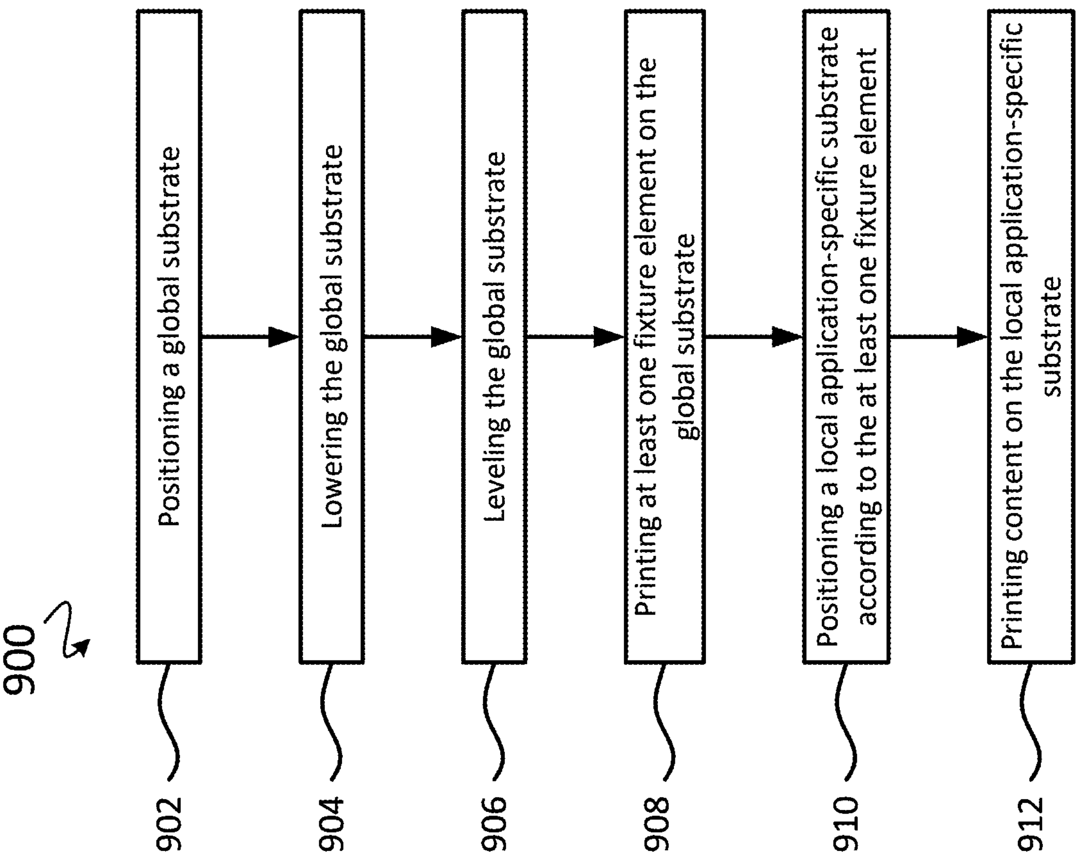
FIG. 9 is a flowchart for a method for 3D printing on an application-specific substrate, in accordance with some aspects.

FIG. 9 is a flowchart for a method for 3D printing on an application-specific substrate, in accordance with some aspects. The particular steps, order of steps, and combination of steps are shown for illustrative and explanatory purposes only. Other examples can implement different particular steps, orders of steps, and combinations of steps to achieve similar functions or results. A method 900 begins at block 902 where a global substrate 18$_G$ (e.g., first substrate) is positioned in forks 16 of the PRPS 10. At block 904, the global substrate 18$_G$ is lowered into the vat 12 and submerged into the resin pool 14. At block 906, the global substrate 18$_G$ may be mechanically or electrically (e.g., by motors) leveled to ensure its initial flatness and planarity closely match the resin pool level. This leveling process may be performed manually by using fasteners, jacks or shims, or automatically by implementing motorized actuators, laser leveling system, piezoelectric actuators, sensors or the like. In one example, actuators or sensors 31 are coupled to the recoater system 30 to measure and level the application-specific substrate 18 to the resin level surface. Leveling techniques, such as described in the '743 U.S. Patent incorporated herein, may be used to mechanically level the global substrate 18$_G$ to the resin level surface.

At block 908, the global substrate 18$_G$ is oriented to face the camera 20 and the image projection system 22. At least one fixture element 28B$_G$ is printed on the global substrate 18$_G$. At block 910, once the at least one fixture element 28B$_G$ is formed on the global substrate 18$_G$, a local application-specific substrate 18$_L$ (e.g., second substrate) is positioned according to the at least one fixture element 28B$_G$. In this way, the at least one fixture element 28B$_G$ aligns the local application-specific substrate 18$_L$ for printing. The local application-specific substrate $18_L$ is positioned facing the camera 20 and the image projection system 22. At block 912, content is printed on the local application-specific substrate $18_L$.

The printed content and the local application-specific substrate $18_L$ are incorporated into the finished product after the printing process. In some examples, the global substrate $18_G$, includes at least one fixture element $28B_G$ and serves as the build platform and alignment fixture during printing. The global substrate $18_G$ may not be part of the finished product and may instead function solely as a temporary support structure to enable accurate positioning and printing onto the local application-specific substrate $18_L$.

In some examples, the movement of substrates may be performed by an automated mechanism, such as a robotic mechanism. The automated movement (e.g., positioning and/or transporting the application-specific substrate and global substrate) may be performed as part of an automated additive manufacturing production line where sensors on the PRPS 10 and other auxiliary equipment may provide feedback to a server as described in U.S. Pat. No. 11,054,808, issued Jul. 6, 2021, owned by the assignee of the present application and incorporated by reference herein. The automated production line is configured to manage workflow during the printing process and may also generate alerts in response to detected issues, such as printing errors or equipment maintenance requirements.

Figure 10:
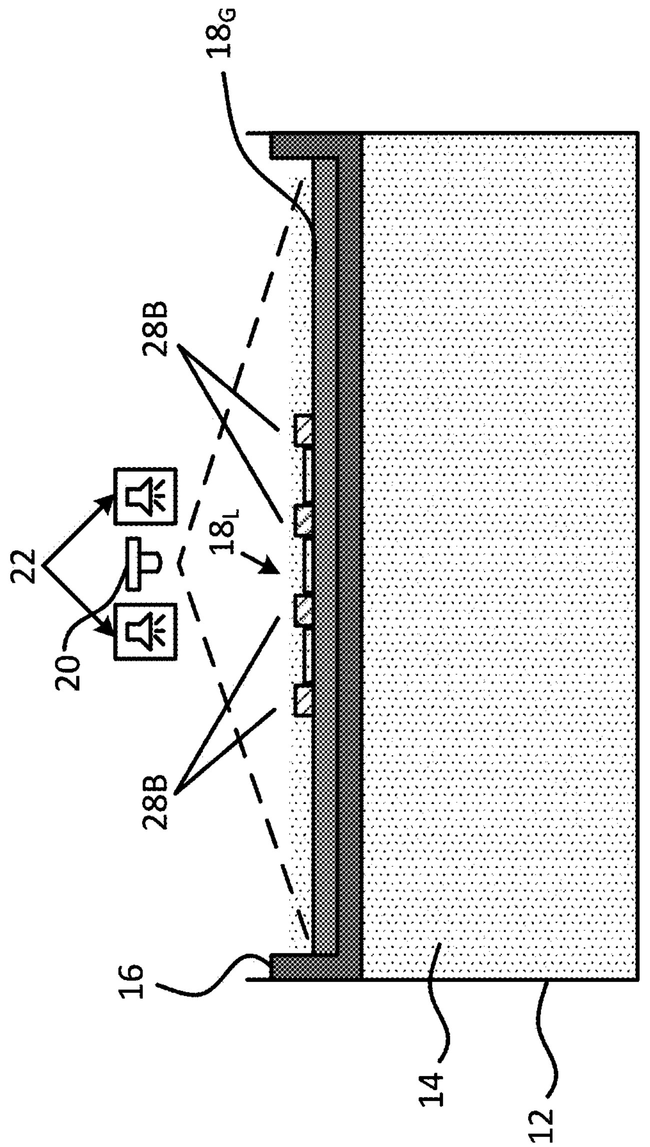
FIG. 10 is a side view schematic of a PRPS during printing, in accordance with some aspects.

FIG. 10 is a side view schematic of a PRPS during printing, in accordance with some aspects. In this example, fixture elements $28B_G$ (e.g., feature 28) are formed on the global substrate $18_G$ and a local application-specific substrate $18_L$ is positioned on the global substrate $18_G$ according to the fixture elements $28B_G$. The image projection system 22 projects a first image onto the local application-specific substrate $18_L$, exposing the resin 14 to ultraviolet light, which crosslinks the resin 14 to form a first solid polymer layer on the local application-specific substrate $18_L$. The global substrate $18_G$, with the local application-specific substrate $18_L$, are then lowered further into the resin pool 14 to form the next layer of the content. This 3D printing process is repeated until all layers of the content is formed. In this manner, the PRPS 10 builds the desired content directly onto the local application-specific substrate $18_L$.

Figure 11:
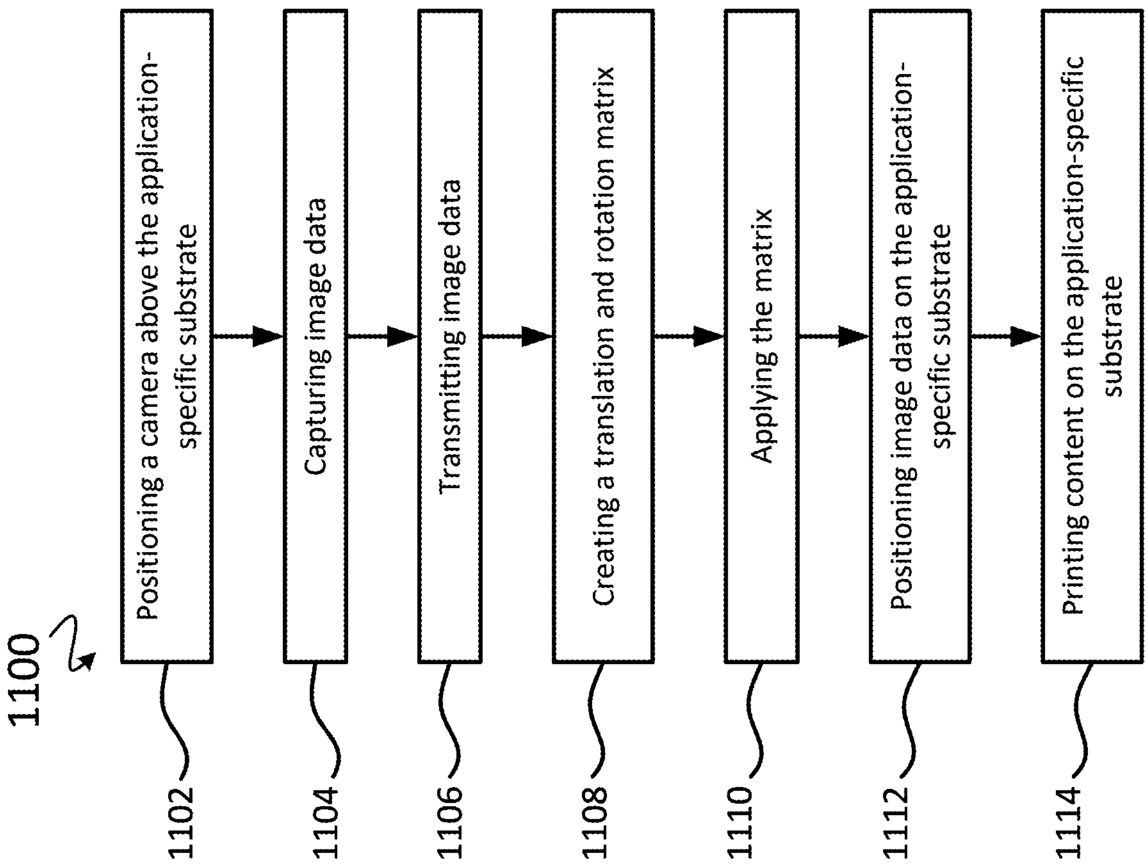
FIG. 11 is a flowchart for a method for adjusting the image projection system of the PRPS, in accordance with some aspects.

FIG. 11 is a flowchart for a method for adjusting the image projection system of the PRPS, in accordance with some aspects. The particular steps, order of steps, and combination of steps are shown for illustrative and explanatory purposes only. Other examples can implement different particular steps, orders of steps, and combinations of steps to achieve similar functions or results. A method 1100 begins at block 1102 where a camera 20 is positioned above the first side of the application-specific substrate 18 in the build area. At block 1104, the camera 20 captures image data of the build area including a feature 28. In this example, the feature 28 may be a fiducial mark 28A, at least one fixture element 28B or a defined portion 28C of the application-specific substrate 18 (e.g., global substrate $18_G$ or the local application-specific substrate $18_L$). At block 1106, the image data is transmitted to the display subsystem 26. At block 1108, the display subsystem detects the fiducial mark 28A, at least one fixture element 28B or defined portion 28C from the image data. As described herein, the fiducial mark 28A, at least one fixture element 28B or defined portion 28C are references that aid in determining the position and orientation of each sub-image in the array from each image projector 24. The display subsystem 26 computes the necessary transformations by creating a combined translation and rotation matrix to map one coordinate system to another from reading the fiducial mark 28A, at least one fixture element 28B or defined portion 28C.

At block 1110, the combined translation and rotation matrix is applied by the display subsystem 26. In other words, the display subsystem 26 is configured to operatively control each image projector 24 of the plurality of image projectors to adjust properties and alignment of a position of each sub-image in the array. At block 1112, the display subsystem 26 may modify, translate, offset, and/or rotate the layer image data to digitally position and align it on the application-specific substrate 18. The image projection system 24 projects a first image onto the first side of the application-specific substrate 18, exposing the resin to ultraviolet light, which crosslinks to form a first solid polymer layer on the application-specific substrate 18. At block 1114, the content is printed on the application-specific substrate 18.

FIGS. 12A-12E illustrate several scenarios of printing 3D content using features for positioning and alignment. For example, fixture elements $28B_G$ are first printed on a global substrate $18_G$ then multiple local application-specific substrates $18_L$ (e.g., $18_L1$-$18_L8$) are positioned according to fixture elements $28B_G$. Alternatively, the multiple local application-specific substrates $18_L$ (e.g., $18_L1$-$18_L8$) may be printed within the fixture elements $28B_G$ prior to printing further content 51 (e.g., channels for microfluidics, components on printed circuit boards, or other) on the local application-specific substrates $18_L1$-$18_L8$. In another example, local application-specific substrates $18_L$ (e.g., $18_L1$-$18_L8$) include defined portions $28C_L$ and further content 53 is printed on the local application-specific substrates $18_L$ (e.g., $18_L1$-$18_L8$) according to the defined portions $28C_L$.

Figure 12A:
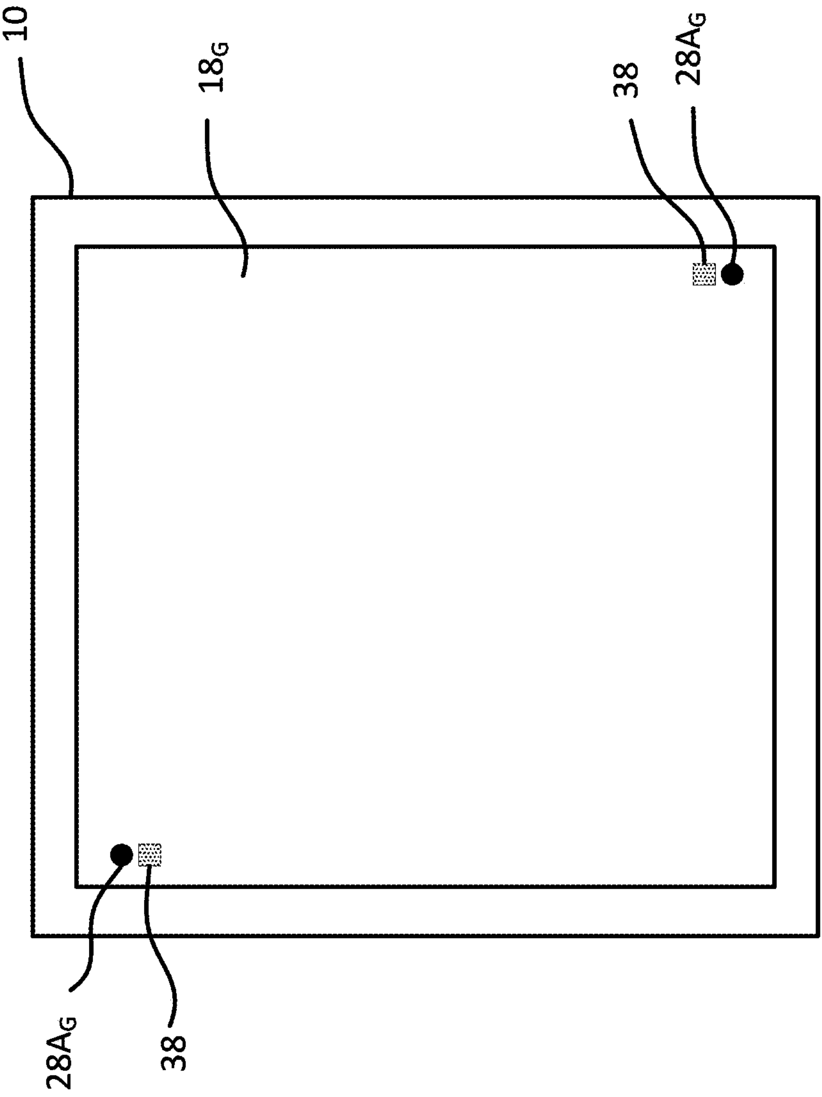
FIG. 12A is a top view of a global substrate, in accordance with some aspects.

FIG. 12A is a top view of a global substrate, in accordance with some aspects. In this example, a global substrate $18_G$ with fiducial marks $28A_G$ and identification marks 38 may be positioned on and supported by the build tray of the PRPS 10, or may itself function as the build tray of the system. As such, the global substrate $18_G$ may be positioned in the forks 16 of the PRPS 10 (shown in FIG. 1A). The global substrate $18_G$ may be comprised of wood, aluminum, steel, a composite material, glass, cured resin, or other suitable materials. In some examples, the global substrate $18_G$ is fabricated in advance using the same PRPS 10 through a 3D printing process.

Figure 12B:
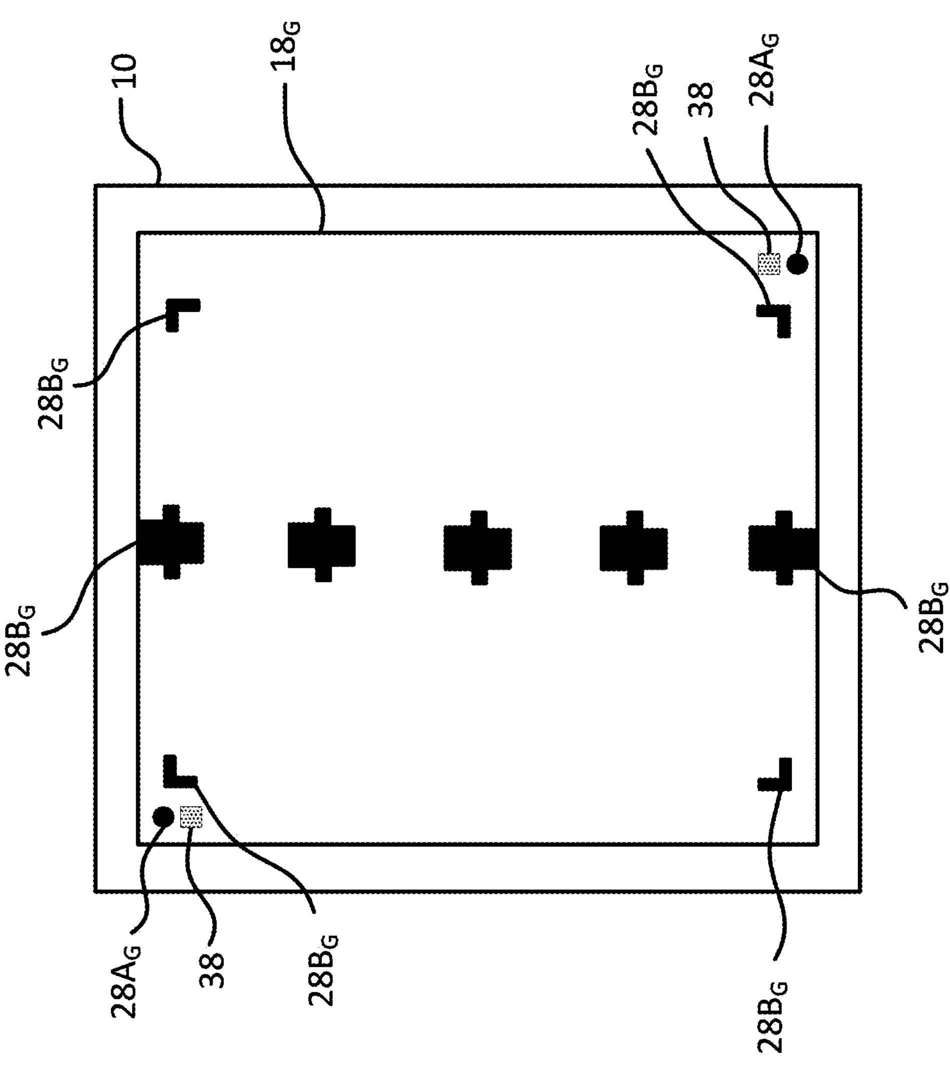
FIG. 12B is a top view of a global substrate with fixture elements, in accordance with some aspects.

FIG. 12B is a top view of a global substrate with fixture elements, in accordance with some aspects. The PRPS 10 utilizes the global fiducial marks $28A_G$ on the global substrate $18_G$ for alignment, and fixture elements $28B_G$ may be 3D printed directly on the global substrate $18_G$ as described in previous sections of this disclosure.

Figure 12C:
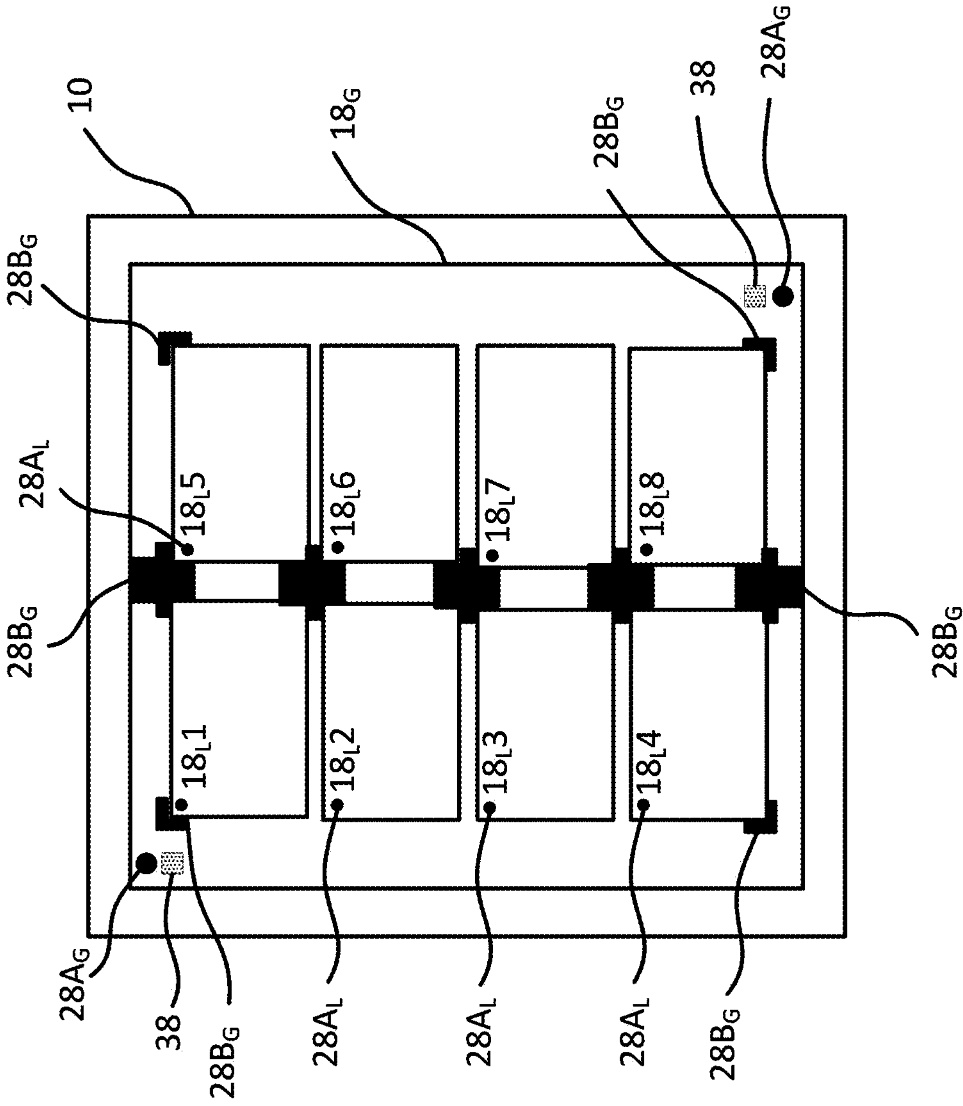
FIG. 12C is a top view of a global substrate with an array of application-specific substrates, in accordance with some aspects.

FIG. 12C is a top view of a global substrate with an array of application-specific substrates, in accordance with some aspects. In some examples, the fixture elements $28B_G$ on the global substrate $18_G$ are utilized to align an array of local application-specific substrates $18_L1$ through $18_L8$. For instance, each local application-specific substrate $18_L1$ through $18_L8$ may be positioned between the fixture elements $28B_G$ on the global substrate $18_G$, ensuring that it is securely held in place. In other examples, each local application-specific substrate $18_L1$ through $18_L8$ may be printed between the fixture elements $28B_G$ on the global substrate $18_G$. In both of these examples, the feature 28 of the fixture elements $28B_G$ are used to position and align each local application-specific substrate $18_L1$ through $18_L8$. Each local application-specific substrate $18_L1$ through $18_L8$ may include fiducial marks $28A_L$. For clarity, reference labels for fiducial marks $28A_L$ are shown only on substrates $18_L2$ through $18_L5$. Each local application-specific substrate $18_L1$ through $18_L8$ may also include local identification marks, which are not shown.

Figure 12D:
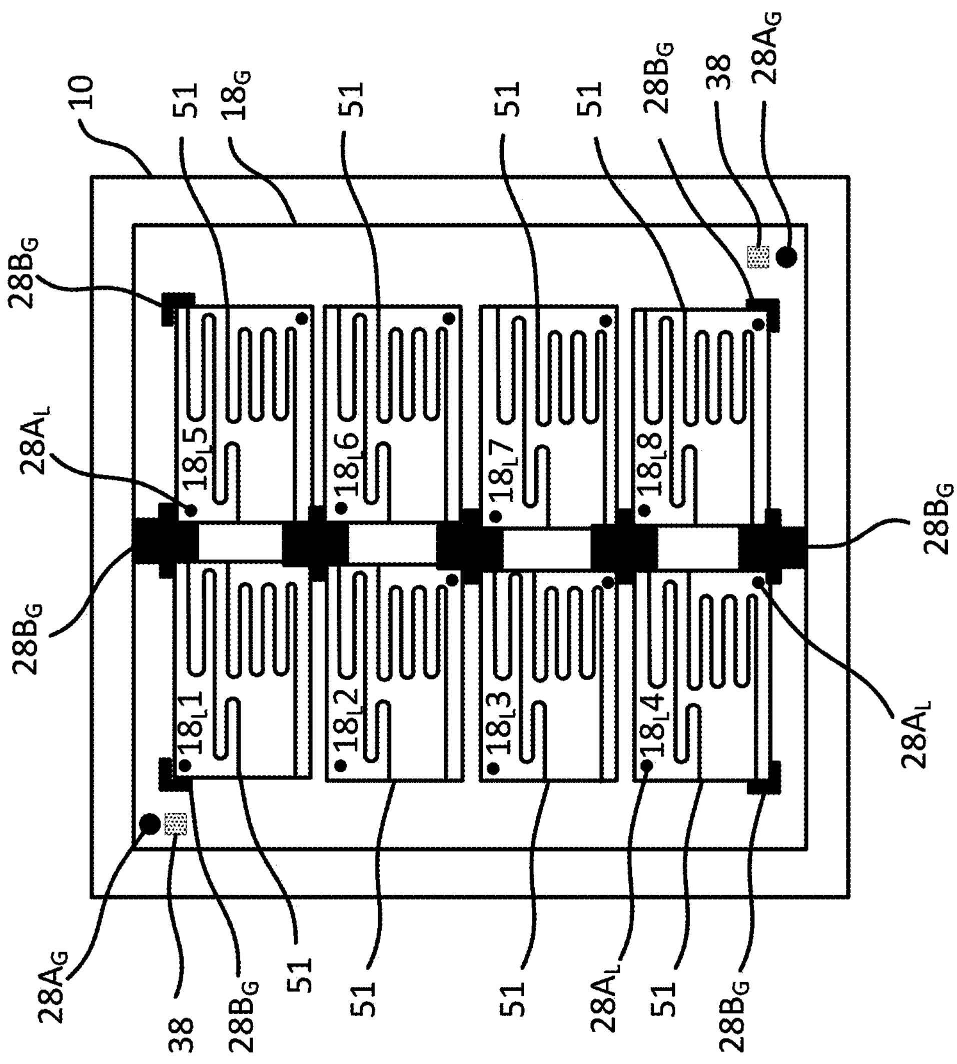
FIGS. 12D and 12E are top views of a global substrate with an array of application-specific substrates and printed content, in accordance with some aspects.

FIG. 12D is a top view of a global substrate with an array of application-specific substrates and printed content, in accordance with some aspects. With the local application-specific substrates $18_L1$ through $18_L8$ positioned according to the fixture elements $28B_G$ on the global substrate $18_G$, further content 51 is printed on the local application-specific substrates $18_L1$ through $18_L8$, such as channels for microfluidics.

Figure 12E:
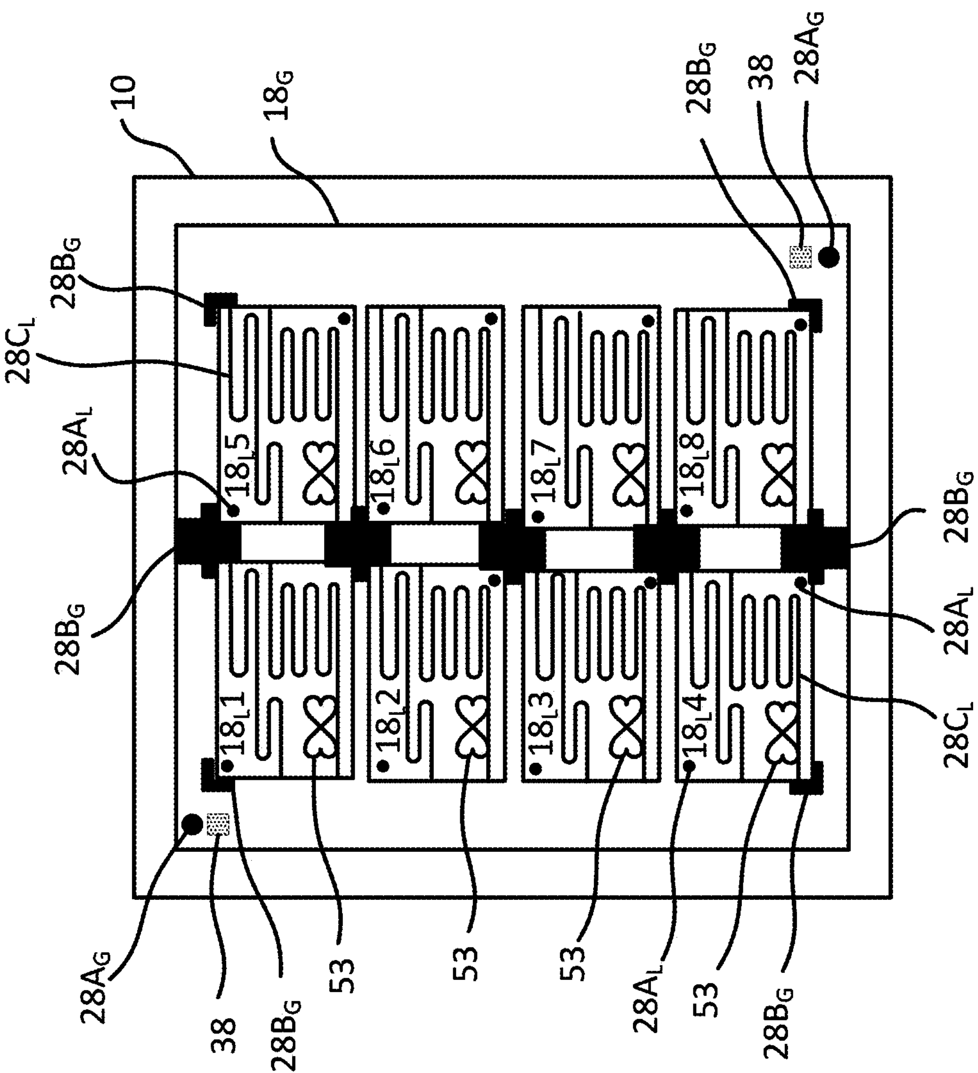

FIG. 12E is a top view of a global substrate with an array of application-specific substrates and printed content, in accordance with some aspects. In some examples, prior to printing, the local application-specific substrates $18_L1$ through $18_L8$ include defined portions $28C_L$ (only $18_L4$ through $18_L5$ are labeled for clarity) which may comprise channels for microfluidic devices, components of printed circuit boards, or other functional or structural features. The local application-specific substrates $18_L1$ through $18_L8$ are positioned on the global substrate $18_G$ in accordance with fixture elements $28B_G$. The defined portions $28C_L$, along with any other features 28 present within the build area, may be used to align image data for printing additional content 53 onto the local application-specific substrates $18_L1$ through $18_L8$.

In the examples shown in FIGS. 12A through 12E, print alignment accuracy is achieved using at least one feature 28, such as fiducial marks $28A_G$, fiducial marks $28A_L$, fixture elements $28B_G$ or defined portions $28C_L$.

Figure 13:
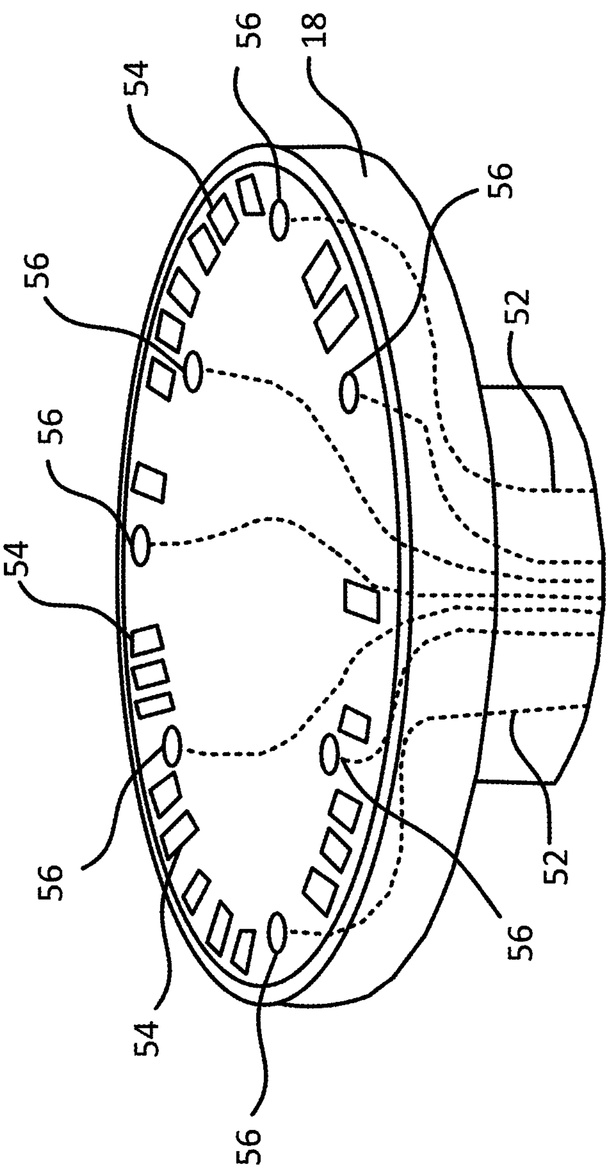
FIG. 13 is a perspective view of an application-specific substrate, in accordance with some aspects.

FIG. 13 is a perspective view of an application-specific substrate, in accordance with some aspects. In this example, the application-specific substrate 18 is unconventional in the context of 3D printing, as it involves a solid disk component with internal channels 52. The disk may be a polishing component or polishing disk, such as a wafer polishing wheel used in silicon wafer manufacturing. For 3D printing, in some examples, the application-specific substrate 18 is secured in the forks 16 of the PRPS 10 as shown in FIGS. 5A and 5B, which may mechanically couple to the application-specific substrate 18 using cam-locks, clamps, vices, fasteners, or other means. In other examples, a hollow, frame-like global substrate $18_G$ with an open center region and fixture elements 28B, as shown in FIG. 4A, may be used as the forks 16 (e.g., holding device) or in conjunction with it.

The content includes polishing disk elements 54 (for clarity, not all labeled) printed on a top surface of the application-specific substrate 18 (e.g., wafer polishing wheel). Ports 56 are printed that precisely align with the internal channels 52 of the application-specific substrate 18. As such, channels 52, polishing disk elements 54, and ports 56 serve multiple purposes including cooling, polishing compound dispensing, sensor acquisition channels, among others. In some examples, an end of the channels 52 on the top surface of the application-specific substrate 18 serve as defined portions 28C (e.g., features 28) for print alignment accuracy for other printed content such as the polishing elements 54 and ports 56. The polishing elements 54 are printed strategically on the top surface of the application-specific substrate 18 away from the ports 56. In other examples, the application-specific substrate 18 may include other features 28 such as fiducial marks 28A and/or fixture elements 28B as described in other sections, for print accuracy of the polishing elements 54 and ports 56 relative to the application-specific substrate 18.

After a print job is completed, the application-specific substrate 18 may undergo an automated additive manufacturing workflow for traceability, quality assurance, and business analytics. The workflow techniques as described in the '808 U.S. Patent incorporated herein, may be applied to the application-specific substrate 18. As an example, the application-specific substrate 18 may be placed into a spinning device for residual resin drainage, improved surface finishing, and resin reclamation purposes. A spinning device is described in later sections of this disclosure. Moreover, spinning techniques and smooth surface finish techniques as described in U.S. Pat. No. 10,759,116, issued Sep. 1, 2020, owned by the assignee of the present application and incorporated by reference herein, and in U.S. Pat. No. 11,623,397, issued Apr. 11, 2023, owned by the assignee of the present application and incorporated by reference herein, may be applied to the application-specific substrate 18.

A matchplate is a type of pattern mounting system used in sand-casting processes. It involves a flat plate with the pattern attached to it on one or both sides. The matchplate aligns and supports the pattern halves during the sand-casting process, ensuring that the mold cavities created are consistent and accurate. FIG. 14 is a perspective view of a matchplate 90 with a first pattern 92*a* and a second pattern 92*b* attached, as known in the art. "Pattern 92" refers generally to both the first pattern 92*a* and the second pattern 92*b*, which are formed on opposite sides of the matchplate 90.

Currently, matchplate patterns may be fabricated using various methods. One modern technique involves the use of 3D printing, which comprises distinct steps such as 3D printing the patterns and subsequently attaching them to a matchplate. Typically, the patterns are secured to a first side and a second side of the matchplate using pins, slots, and other locating features. Matchplates are constructed from materials such as wood, aluminum, steel, or composite materials, selected based on specific requirements and production volumes. However, there are several drawbacks to the contemporary approach of 3D printing the pattern and then attaching it to the matchplate. For instance, the patterns require support during the 3D printing process and must be hollowed out afterward. Additionally, the patterns must be carefully removed, addressing common 3D printing issues such as flatness, curling, and distortion problems. After removal, the patterns must be cured, and finally, they need to be accurately positioned on the matchplate to ensure that the top and bottom patterns align correctly and fit into recesses on the matchplate.

FIGS. 15 and 16 are front views of a sand-casting process, as known in the art. In FIG. 15, the matchplate 90 with the pattern 92 is placed between a top sand box 94 (e.g., cope) and a bottom sand box 96 (e.g., drag). Each sand box 94 and 96 is configured to hold sand. During the process, both sides of the matchplate 90 are filled with sand. The sand is packed tightly around the patterns 92 by vibration, compaction, or pneumatic ramming, ensuring that the sand conforms closely to the shape of the pattern 92. In FIG. 16, the matchplate 90 is positioned between the top sand box 94 and the bottom sand box 96 so the matchplate 90 effectively acts as a "sandwich" layer, with sand molds forming on both sides. The pressure applied ensures that the sand forms a precise mold cavity.

The matchplate 90 remains in place while the sand molds are gently extracted. This results in the top and bottom sand boxes 94 and 96 (cope and drag) with an exact impression of the patterns 92. These cavities will form the final shape of the part. Molten metal (or another material) is poured into the mold cavities. The metal flows through pre-formed channels and takes the shape of the pattern cavities. Once the metal has solidified, the sand molds are broken apart, and the casted parts are retrieved. The casted parts may then undergo additional finishing operations, such as grinding, machining, or heat treatment, to achieve the desired specifications. The name "matchplate" is used to refer to the notion that both sides (above and below the plate) match-up. That is, both top and bottom geometries on the matchplate 90 match-up to form a 3D pattern of a part when the matchplate 90 is removed after being compressed into the sand boxes 94 and 96. In order for the top and bottom geometries to match-up, precise alignment and secure attachment of the patterns 92 to the matchplate 90 are crucial.

Figure 17A:
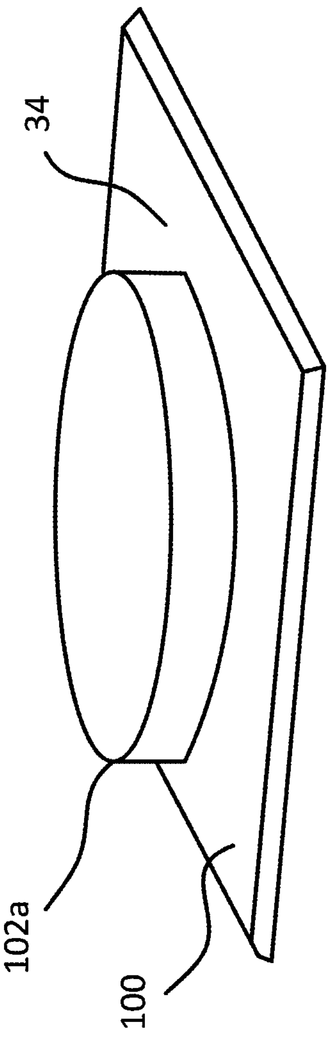
FIG. 17A is a perspective view of an application-specific substrate with content on a first side, in accordance with some aspects.
Figure 17B:
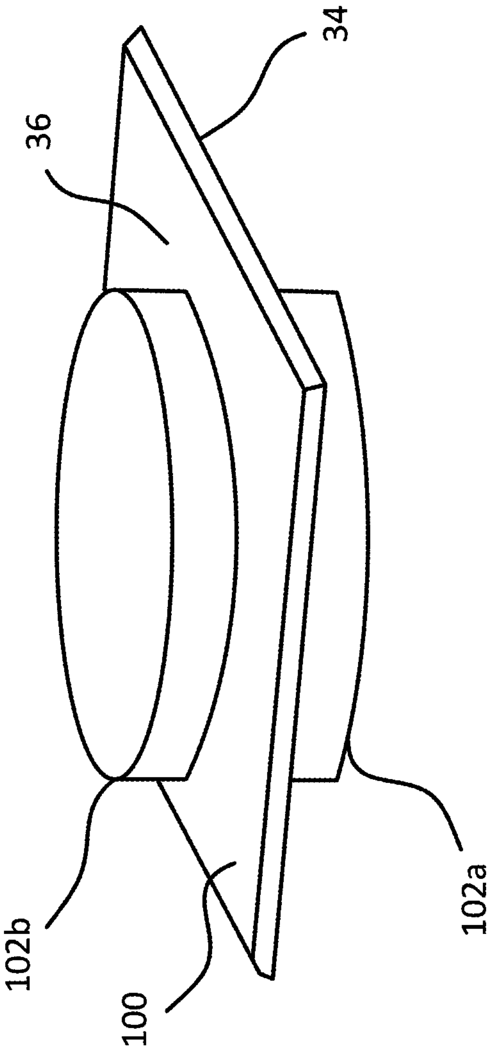
FIG. 17B is a perspective view of an application-specific substrate with content on a first side and a second side, in accordance with some aspects.

FIG. 17A is a perspective view of an application-specific substrate with content on a first side, and FIG. 17B is a perspective view of an application-specific substrate with content on a first side and a second side, both in accordance with some aspects. Additive manufacturing systems and methods may be used to create matchplates 100 with content, such as patterns 102. In this disclosure, the term "pattern 102" refers generally to both the first pattern 102*a* and the second pattern 102*b*, which are formed on opposite sides of the matchplate 100. In some aspects, the additive manufacturing system is a PRPS 10, as shown in FIG. 1A. In this example, the application-specific substrate 18 is a matchplate 100, and the PRPS 10 is used to fabricate the matchplate 100 itself and deposit the patterns 102, which constitute the printed content.

In FIG. 17A, the matchplate 100 (e.g., application-specific substrate) has a first pattern 102*a* printed on a first side 34 of the matchplate 100. For example, one half of a pattern 102 (e.g., 102*a*) for sand-casting is directly 3D printed on the first side 34 of the matchplate 100 when the first side 34 is facing toward the image projection system 22 (as shown in FIGS. 1A, 6A, 6B and 10). The first pattern 102*a* adheres to the surface of the matchplate 100. In FIG. 17B, the matchplate 100 is then flipped over so that that the second side 36 faces toward the image projection system 22. The other half of the pattern 102 (e.g., 102*b*) is directly 3D printed on the second side 36 of the matchplate 100. The matchplate 100 with first pattern 102*a* and the second pattern 102*b* is now ready for the sand-casting process and is incorporated into the finished product.

Figure 18:
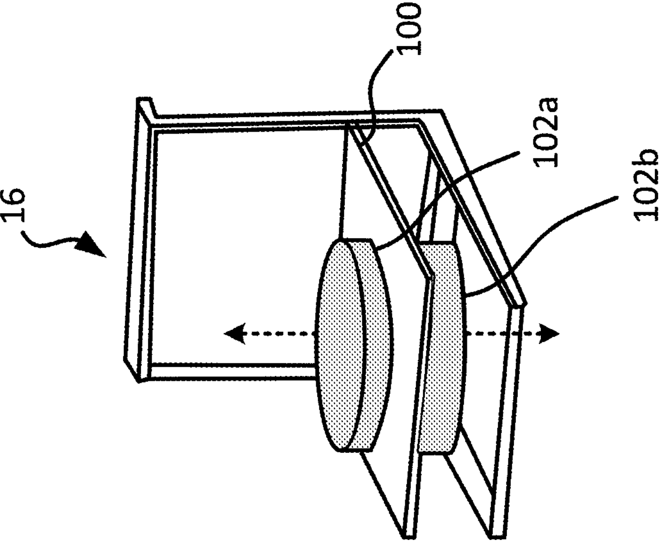
FIG. 18 depicts a perspective view of the holding device with a matchplate, in accordance with some aspects.

FIG. 18 depicts a perspective view of the holding device with a matchplate, in accordance with some aspects. As described with reference to FIG. 5B, the forks 16 may be configured to hold and support the matchplate 100. For example, the forks 16 (e.g., fork arms) may be further apart than standard elevator arms to accommodate the content on both surfaces of the matchplate 100 such as the first side 34 and the second side 36. In some examples, the forks 16 of the PRPS 10 are further configured to rotate or turn over the matchplate 100, enabling patterns 102 to be printed on the second side 36 of the matchplate 100. In other examples, the matchplate 100 may be manually reoriented within the forks 16 to permit printing on the opposite side. The arrows indicate the direction of the matchplate 100 being placed into the forks 16 or removed from the forks 16.

Figure 19:
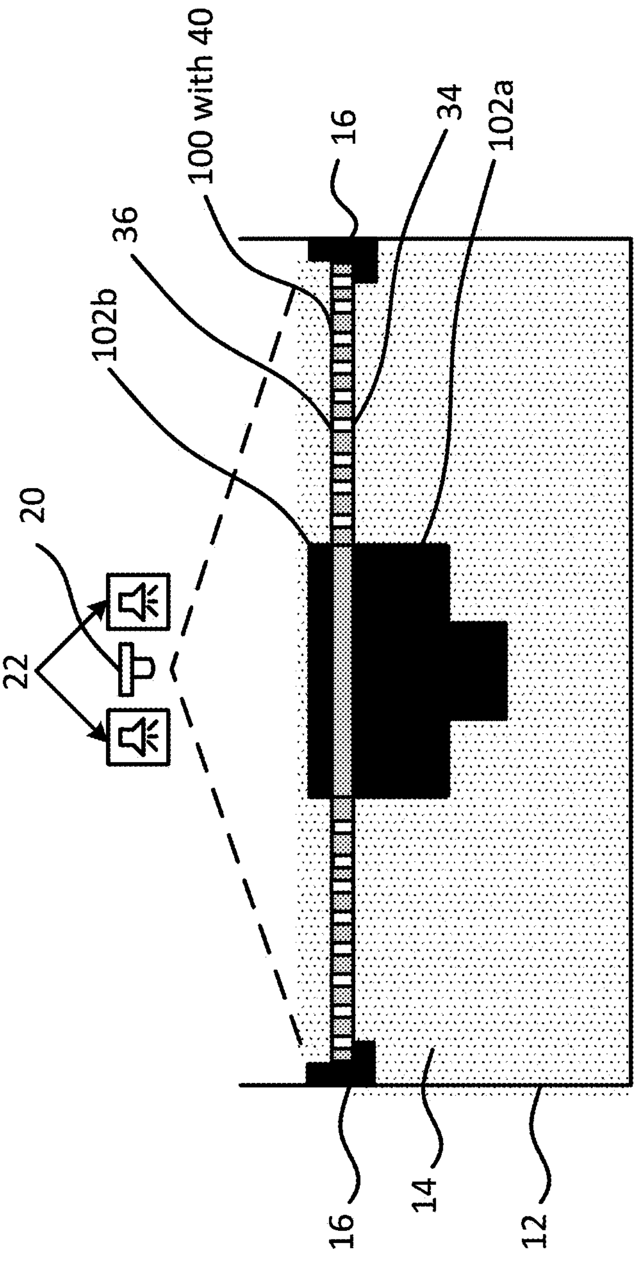
FIG. 19 is a side view schematic of 3D printing a pattern on a second side of a matchplate, in accordance with some aspects.

FIG. 19 is a side view schematic illustrating 3D printing of a pattern on a second side of a matchplate, in accordance with some aspects. To accommodate the matchplate 100 after it has been turned over in the forks 16, the vat 12 is configured with sufficient depth to fully submerge the first pattern 102*a*, which protrudes from the first side 34 of the matchplate 100, into the resin pool 14. The forks 16 and the vat 12 are configured and dimensioned to support the matchplate 100 during printing of the second pattern 102*b* on the second side 36, following the printing of the first pattern 102*a* on the first side 34. During printing of the second pattern 102*b*, the first side 34 of the matchplate 100 faces away from the image projection system 22.

As shown in FIG. 19, the matchplate 100 may include a plurality of through holes 40, which are described with reference to FIGS. 3A through 3D. While the second pattern 102*b* is being printed, the first pattern 102*a* on the first side 34 remains fully submerged in the resin pool 14, and the second side 36 faces the camera 20 and image projection system 22 for accurate alignment and exposure.

Matchplates 100 may be any shape such as square, rectangular (shown in FIGS. 3A, 3C and 3D), octagonal (shown in FIG. 3B), or the like, and may be comprised of wood, aluminum, steel, or a composite material. In some examples, the matchplate 100 may be 3D printed of resin materials. Matchplates 100 are sized depending on the application. The length and width of the matchplate 100 may be customized based on the intended application. In various examples, the matchplate 100 may have dimensions ranging from 5 cm to 203 cm, for example. Example dimensions may include, but are not limited to 152 cm by 122 cm, 122 cm by 91 cm, 61 cm by 61 cm, 55 cm by 45 cm, 30 cm by 23 cm, or 15 cm by 10 cm. It will be understood that any suitable size may be used, depending on the design and operational requirements.

Figure 20:
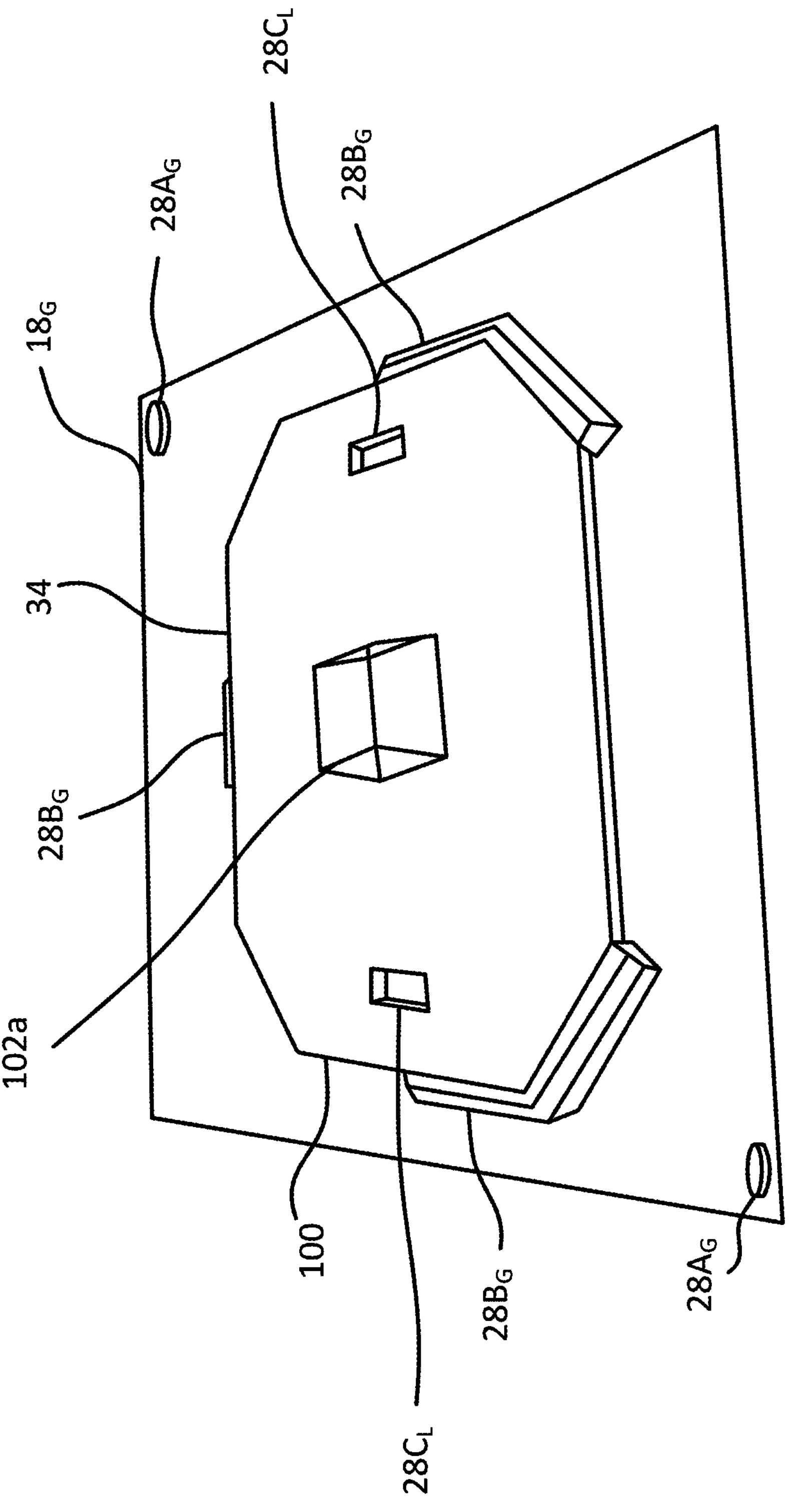
FIG. 20 is a perspective view of features on a global substrate and a matchplate, in accordance with some aspects.

The application-specific substrate 18 for the example of a matchplate 100, may include features 28 as described in previous sections of this disclosure. The features 28 may include a fiducial mark 28A, at least one fixture element 28B or a defined portion 28C of the matchplate 100. FIG. 20 is a perspective view of features on a global substrate and a matchplate, in accordance with some aspects. In some scenarios, fiducial marks $\mathbf{28}A_G$ and fixture elements $\mathbf{28}B_G$ may be 3D printed on a global substrate $\mathbf{18}_G$. In other scenarios, the fiducial marks $\mathbf{28}A_G$ may be present on the global substrate $\mathbf{18}_G$ as received, prior to any printing. The global substrate $\mathbf{18}_G$ may be a second application-specific substrate 18 which was previously printed using the PRPS 10 or it may be a build plate (or tray) of the PRPS 10.

The at least one fixture element 28B may be configured to hold and accurately align the matchplate 100 within the system to enable precise 3D printing of the pattern 102, such as pattern 102*a* shown on the first side 34 of the matchplate 100. A "blank" matchplate 100 may be either fabricated using the 3D printing system or physically positioned within the fixture elements 28B prior to printing. Once properly aligned, the pattern 102 is then 3D printed directly onto the surface of the matchplate 100. This approach has been previously described in the context of a global substrate $\mathbf{18}_G$ and a local application-specific substrate $\mathbf{18}_L$. In the present example, the matchplate 100 functions as a local application-specific substrate $\mathbf{18}_L$, with the fixture elements 28B on the global substrate $\mathbf{18}_G$ ensuring proper orientation and positioning during the printing process.

In other examples, both the matchplate 100 and the pattern 102 are 3D printed simultaneously between the fixture elements 28B. In some examples, the fixture elements 28B may be 3D printed on a hollow matchplate 100 such as on the "frame" as shown in FIGS. 4A-4D. In this way, the matchplate 100 can then be repositioned such as by flipping over for opposite side (e.g., second side 36) printing. In any of these examples, the use of a feature such as a fiducial mark $\mathbf{28}A_G$, at least one fixture element $\mathbf{28}B_G$, or a defined portion $28C_G$ of the matchplate 100 facilitates accurate printing of at least one of the global substrate $18_G$, the matchplate 100, and the pattern 102 on the matchplate 100. The fixture elements $28B_G$, in particular, enable precise alignment of the matchplate 100 within the system, as described elsewhere in this disclosure.

Figure 21:
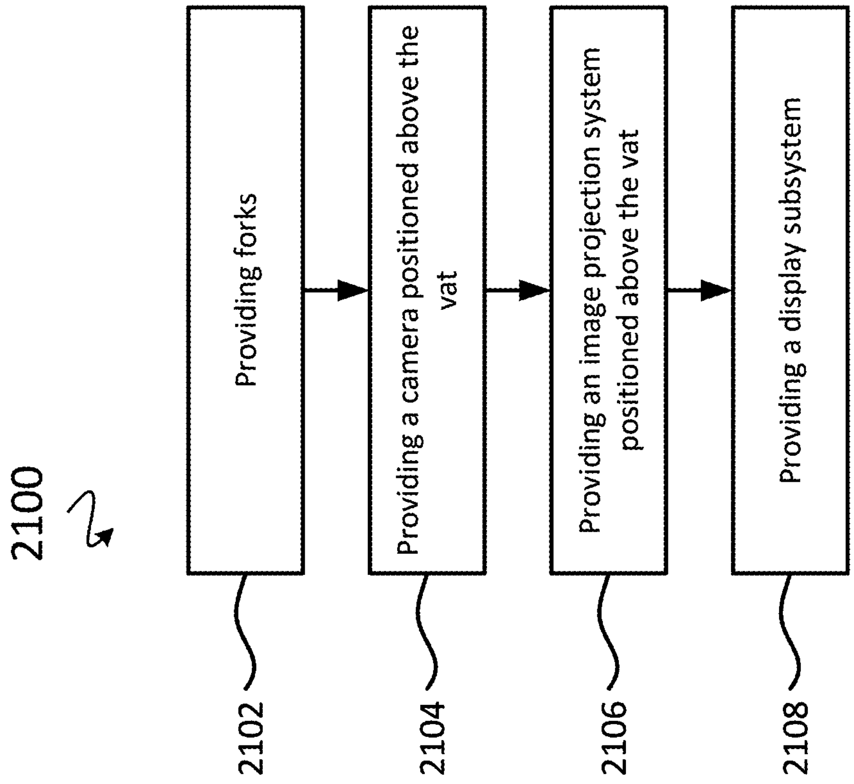
FIG. 21 is a flowchart for a method for 3D printing a pattern on a matchplate, in accordance with some aspects.

FIG. 21 is a flowchart for a method for 3D printing a pattern on a matchplate, in accordance with some aspects. The particular steps, order of steps, and combination of steps are shown for illustrative and explanatory purposes only. Other examples can implement different particular steps, orders of steps, and combinations of steps to achieve similar functions or results. A method 2100 begins at block 2102 by providing forks 16. The forks 16 are configured to support a matchplate 100 over a vat 12 having a resin pool 14. The matchplate 100 is submerged in the resin pool 14. At block 2104, a camera 20 positioned above the vat 12 is provided. The camera 20 is configured to capture image data from the matchplate 100, such as a feature 28 (fiducial mark 28A, at least one fixture element 28B, or defined portion 28C of the matchplate 100), and transmit the image data. At block 2106, an image projection system 22 positioned above the vat 12 is provided. The image projection system 22 is configured to project a composite image onto the resin pool 14 onto a matchplate 100. The image projection system 22 comprises a plurality of image projectors, each image projector 24 of the plurality of image projectors projects a sub-image onto a portion of the resin pool 14, and the composite image comprises a plurality of sub-images arranged in an array.

At block 2108, a display subsystem 26 is provided. The display subsystem is configured to detect a feature 28 in the build area (e.g., global substrate $18_G$ or matchplate 100) from the image data and estimate a position and an orientation of the feature 28 on the matchplate 100 relative to the camera. The display subsystem 26 is configured to operatively control each image projector 24 of the plurality of image projectors to adjust properties and alignment of a position of each sub-image in the array based on the position and the orientation of the feature 28.

Figure 22:
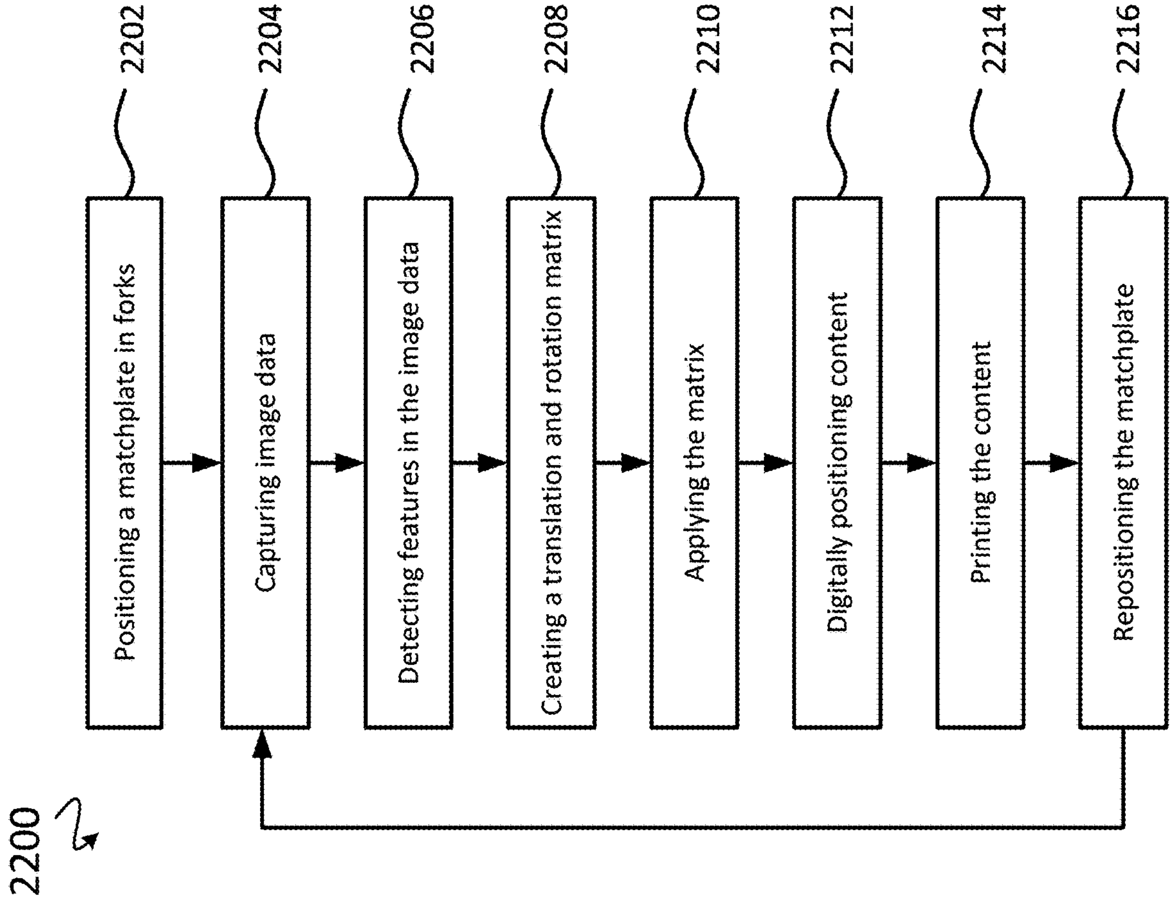
FIG. 22 is a flowchart for a method for adjusting the image projection system of the PRPS, in accordance with some aspects.

FIG. 22 is a flowchart for a method for adjusting the image projection system of the PRPS, in accordance with some aspects. The particular steps, order of steps, and combination of steps are shown for illustrative and explanatory purposes only. Other examples can implement different particular steps, orders of steps, and combinations of steps to achieve similar functions or results. A method 2200 begins at block 2202 where a matchplate 100 is positioned in forks 16 of the PRPS 10. At block 2204, a camera 20 positioned above the first side 34 of the matchplate 100, captures images of the build area (e.g., global substrate $18_G$ or matchplate 100) including a feature 28. At block 2206, the image data is transmitted to the display subsystem 26 and the display subsystem detects the feature 28 from the image data. As described herein, the features 28 are reference markers on the global substrate $18_G$ or matchplate 100 that help in determining the position and orientation of each sub-image in the array from each image projector 24. At block 2208, the display subsystem 26 generates (i.e., creates) the necessary transformations by creating a combined translation and rotation matrix to map one coordinate system to another. This is described on other sections in this disclosure.

At block 2210, the combined translation and rotation matrix is applied by the display subsystem 26. In other words, the display subsystem 26 is configured to operatively control each image projector 24 of the plurality of image projectors to adjust properties and alignment of a position of each sub-image in the array. For example, at block 2212, the display subsystem 26 may modify, translate, offset, and/or rotate the layer image data (e.g., content) to digitally position and align it on the matchplate 100. At block 2214, the image projection system 22 projects a first image onto the first side 34 of the matchplate 100, exposing the resin to ultraviolet light, which crosslinks to form a first solid polymer layer on the matchplate 100, thus printing the content. The 3D printing process is repeated until all layers of content (e.g., pattern 102*a*) are formed.

Once pattern 102*a* is formed on the matchplate 100, at block 2216, the matchplate 100 repositioned such as flipped or turned over, exposing the second side 36 (e.g., bottom side) to the camera 20 and image projection system 22. The method then returns to block 2204, where blocks 2204-2214 are repeated, resulting in pattern 102*b* being 3D printed on the second side 36 of the matchplate 100. In some examples, the method may end at block 2214 after the pattern 102*a* is 3D printed on the first side 34 of the matchplate 100, for example, if a pattern 102 is only required on one side of the matchplate 100. The matchplate 100 and pattern 102 are incorporated in a finished product after the printing.

Figure 23:
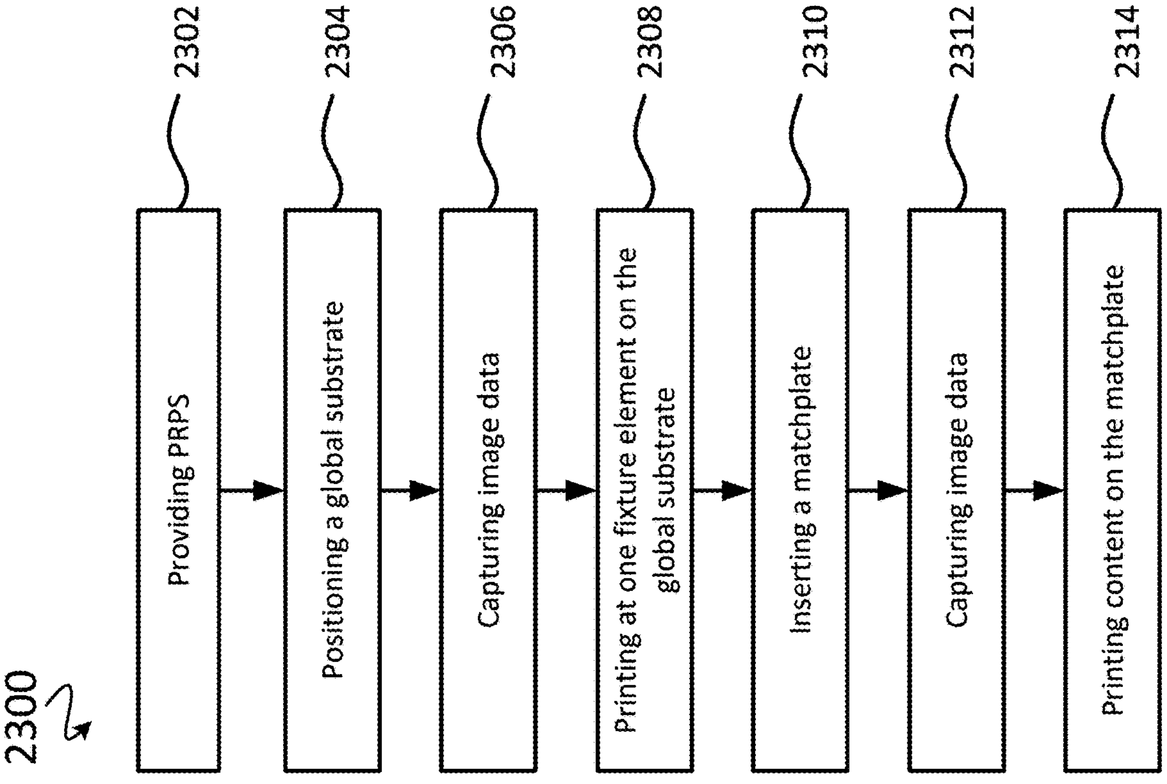
FIG. 23 is a flowchart for a method for 3D printing a pattern on a matchplate, in accordance with some aspects.

FIG. 23 is a flowchart for a method for 3D printing a pattern on a matchplate, in accordance with some aspects. The particular steps, order of steps, and combination of steps are shown for illustrative and explanatory purposes only. Other examples can implement different particular steps, orders of steps, and combinations of steps to achieve similar functions or results. A method 2300 begins at block 2302 by providing a PRPS 10. At block 2304, a first substrate, such as a global substrate $18_G$, is positioned in forks 16 of the PRPS 10. The global substrate $18_G$ has a feature 28 such as fiducial marks $28A_G$. At block 2306, image data from the global substrate $18_G$ is captured by a camera 20 positioned above the vat 12 of the PRPS 10. The image data includes the fiducial marks $28A_G$ on the global substrate $18_G$. At block 2308, fixture elements $28B_G$ are printed on the global substrate $18_G$. The printing of the fixture elements $28B_G$ on the global substrate $18_G$ includes submerging the global substrate $18_G$ a resin pool 14 contained in the vat 12. A composite image is projected onto a surface of the resin pool 14 by an image projector 24 of an image projection system 22. The image projection system 22 is positioned above the vat 12. A display subsystem 26 controls each image projector 24 of the plurality of image projectors to adjust properties and alignment of a position of each sub-image in the array based on a position and an orientation of the feature 28 such as a fiducial mark $28A_G$ and the fixture element $28B_G$.

At block 2310, an application-specific substrate $18_L$ such as a matchplate 100 is positioned in the printed fixture elements $28B_G$. The matchplate 100 may also include features 28 such as a fiducial marks $28A_L$, fixture element $28B_L$ or defined portion $28C_L$. At block 2312, image data from the global substrate $18_G$ and the matchplate 100 is captured by a camera 20 positioned above the vat 12 of the PRPS 10. The image data includes the features 28 both on the global substrate $18_G$ and the matchplate 100. At block 2314, content is printed on the matchplate 100.

Figure 24:
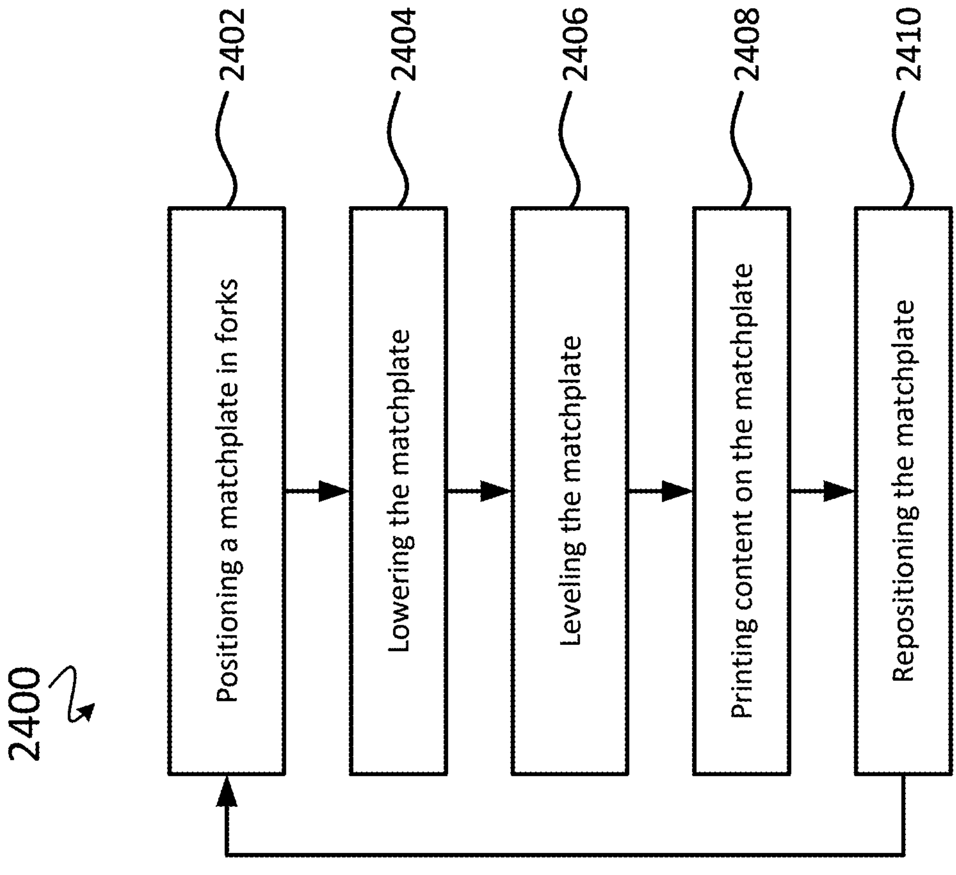
FIG. 24 is a flowchart for a method for 3D printing a pattern on a matchplate, in accordance with some aspects.

FIG. 24 is a flowchart for a method for 3D printing a pattern on a matchplate, in accordance with some aspects. The particular steps, order of steps, and combination of steps are shown for illustrative and explanatory purposes only. Other examples can implement different particular steps, orders of steps, and combinations of steps to achieve similar functions or results. A method 2400 begins at block 2402 where the matchplate 100 is positioned in the forks 16 of the PRPS 10. At block 2404, the matchplate 100 is lowered into the vat 12 and submerged into the resin pool 14. As in other sections of this disclosure, the matchplate 100 may include a plurality of through holes 40 to allow resin to pass from one side of the matchplate 100 to the other side. At block 2406, the matchplate 100 may be mechanically leveled to ensure its initial flatness and planarity closely match the resin pool level. This leveling process may be performed manually by using fasteners, jacks or shims, or automatically by implementing motorized actuators, laser leveling system, piezoelectric actuators, sensors or the like. In one example, actuators or sensors are coupled to the recoater system 30 (shown in FIG. 1B) to measure and level the matchplate 100 to the resin level surface. Leveling techniques, such as described in the '743 U.S. Patent incorporated above, may be used to mechanically level the matchplate 100 to the resin level surface.

At block 2408, the first side 34 (e.g., top side) of the matchplate 100 is oriented to face the camera 20 and image projection system 22, and the pattern 102*a* is printed on this first side 34 of the matchplate 100. At block 2410, after the pattern 102*a* (e.g., content) is printed on the first side 34 of the matchplate 100, the matchplate 100 (e.g., the application-specific substrate) is removed from the forks 16. The matchplate 100 and flipped over or positioned exposing the second side 36 (e.g., bottom side) of the matchplate 100 to the camera 20 so that the second side of the application-specific substrate faces toward the image projection system 22. For example, the matchplate 100 is removed from the forks 16 after the composite image is formed on a first side 34 of the matchplate 100. The matchplate 100 is flipped over to expose a second side 36 of the matchplate 100. The second side 36 is positioned facing the camera 20 and the method 2400 returns to block 2402 and blocks 2402-2408 are repeated printing content on the second side 36 of the matchplate 100.

In some examples, repositioning of the matchplate 100, including flipping, turning, inserting the matchplate 100 onto the forks 16, or removing the matchplate 100 after printing patterns 102 on both sides, may be performed by an automated mechanism. The automated mechanism may include, for example, a robotic system configured to carry out movement and orientation of the matchplate 100 during various stages of the printing process. The automated movement (e.g., repositioning, inverting, and/or transporting the matchplate 100) may be performed as part of an automated additive manufacturing production line where sensors on the PRPS and other auxiliary equipment may provide feedback to a server as described in the '808 U.S. Patent incorporated herein. The automated production line can manage workflow while printing the matchplate 100 and/or patterns and may also send alerts when problems occur (e.g., printing errors, or equipment maintenance issues).

Upon completion of the printing process for the application-specific substrate, the printed substrate may be wetted with an uncured surface finish material. In some examples, the uncured surface finish material may be residual from the printing process itself, while in other examples, it may be applied in a separate step following the printing. For the purposes of this section, a matchplate 100 is used as the example of the application-specific substrate 18; however, the principles described herein are applicable to any type of application-specific substrate 18.

The matchplate 100 and pattern 102 (in some cases, pattern 102*a* on the first side 34 and pattern 102*b* on the second side 36, or only pattern 102*a* on the first side 34), is referred to as a populated matchplate 200. A populated matchplate 200 may also refer to an application-specific substrate with content printed on it. A force is applied to the surface finish material to remove excess surface finish material while retaining a portion of the surface finish material on the populated matchplate 200. In some examples, the force is applied by rotating the populated matchplate 200 on a spinning device 300 such that excess surface finish material is expelled from the populated matchplate 200 while the portion of the surface finish material that remains on the part fills in rough areas and creates a smooth finish. In some aspects, the surface finish material that is removed from the populated matchplate 200 can be collected for reuse. In some examples, the methods include modifying the design used for printing the part, such as by adjusting dimensions and geometric features to compensate for the surface finish material that will be applied to and retained on the part. Thus, the present aspects not only produce parts with high-quality, extremely smooth surface finish, but also with accurate dimensions and geometries.

FIG. 25 is a perspective view of a spinning device, and FIGS. 26A and 27-29 are perspective views of a spinning device with exterior components removed, all in accordance with some aspects. The spinning device 300 includes a housing 302 with side walls 304, top cover 306, bottom cover 308, and door 310 with lock 312. A drain valve 314 is mounted to the bottom cover 308 to provide removal of material from the spinning device 300. A control pad and display unit 316 is mounted to the housing 302 and may be used to operate the spinning device 300, adjust parameters such as rotation speed or duration, and display real-time status information or system alerts to the user.

The spinning device 300 includes a platform 322 that rotates around an axis, such as the Z-axis. Spinning device 300 utilizes a motorized or pneumatic rotation mechanism to achieve this rotation. The platform 322 is connected to the rotation shaft 324 of the mechanism either directly or through belts, gearbox and/or transmission, with the shaft 324 serving as the rotation axis of the spinning device 300. A tray holder 326, which secures the populated matchplate 200 (or other application-specific substrate with content 3D-printed on it), is affixed to the platform 322. The populated matchplate 200 is at least partially wetted with an uncured surface finish material. When the platform 322 rotates, the first portion of the uncured surface finish material is retained on the populated matchplate 200, and a second portion of the uncured surface finish material may be removed. In some examples, most or all of the uncured surface finish material may be removed. In some examples, the populated matchplate 200 may be cured after rotation.

The tray holder 326 is positioned in the spinning device 300 to allow clearance for the pattern 102*a* on first side 34 and pattern 102*b* on the second side 36 of the populated matchplate 200. FIG. 26B is a schematic of a portion of the spinning device with a populated matchplate mounted in a tray holder, in accordance with some aspects. In some examples, the tray holder 326 is positioned with an offset 328 relative to a side wall 304 of the spinning device 300 such that the pattern 102 remains clear of the side walls 304 and any mounting or holding structures that would typically be used to support a traditional one-sided build tray (e.g., content on only one side of the substrate). This configuration accommodates the presence of patterns 102 on both sides of the matchplate 100 and prevents interference during rotation and spinning. For example, the tray offset 328 is the distance between a side wall 304 of the spinning device 300 and the tray holder 326. Data such as the populated matchplate identification, spin time, spin velocity, error states encountered, tray holder position ID, visual confirmation of adequate drainage, before and after mass measurements for resin reclamation analytics, among others, may be acquired from the spinning process and uploaded locally or remotely to an external computing resource such as a cloud, servers, virtual machines, or the like.

Spinning of the populated matchplates 200 may be performed with the populated matchplates 200 in different orientations. In a first example routine (which nay be referred to as "routine1"), as shown in FIG. 26A, the tray holder 326 with the populated matchplate 200 is oriented parallel to the Z-axis in the spinning device 300 with the first side 34 of the populated matchplate 200 positioned facing the interior of the spinning device 300 such as the centerline 330 of the spinning device 300. Hence, the second side 36 of the populated matchplate 200) faces the side wall 304 of the spinning device 300. In a second example routine ("routine2"), the tray holder 326 with the populated matchplate 200 is oriented parallel to the Z-axis in the spinning device 300 with the second side 36 of the populated matchplate 200 positioned facing the interior of the spinning device 300 such as the centerline 330 of the spinning device 300. Hence, the first side 34 of the populated matchplate 200 faces the side wall 304 of the spinning device 300. In some examples, spinning the populated matchplate 200 may involve executing routine1, routine2, or both in any order. For instance, the process can include only routine1, only routine2, or both routines performed sequentially in any sequence.

Figures 27, 28:
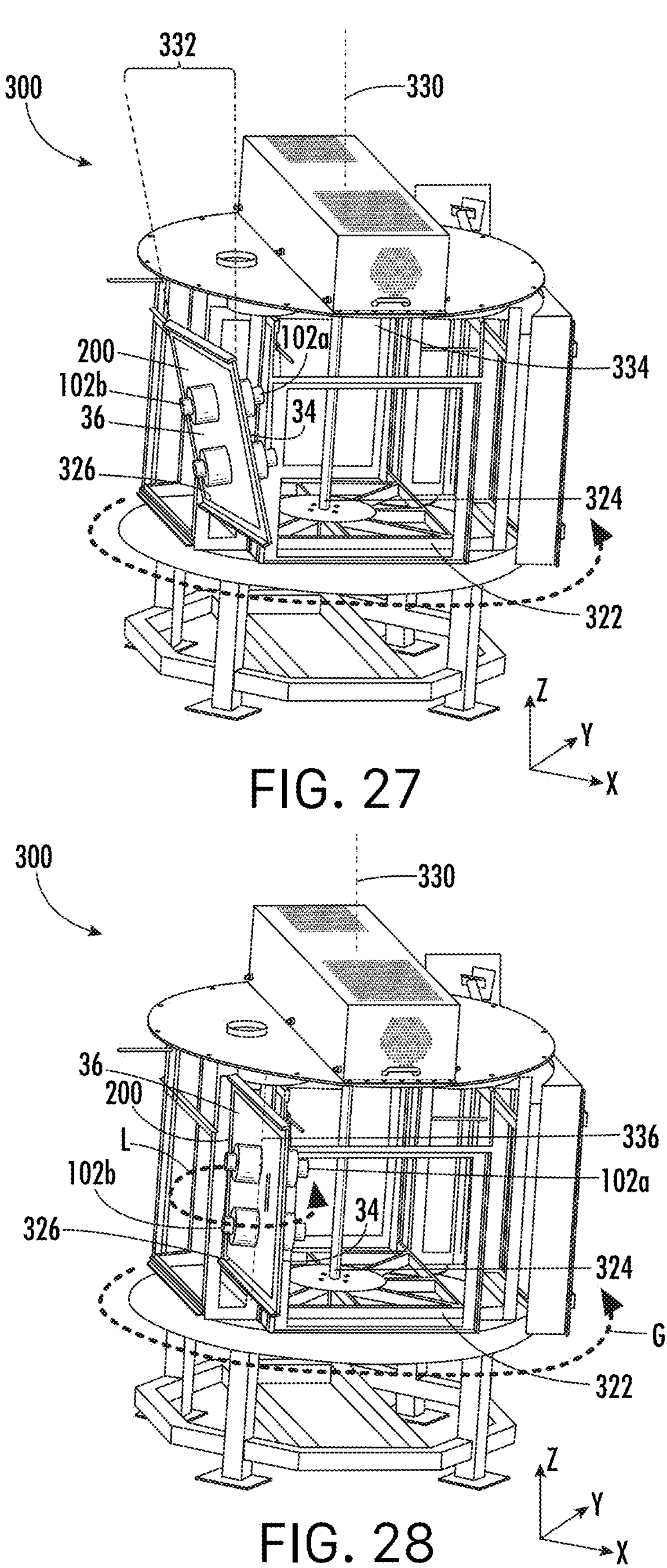
FIGS. 27-29 are perspective views of a spinning device with exterior components removed, all in accordance with some aspects.

In some aspects, as shown in FIG. 27, the tray holder 326 with the populated matchplate 200 is oriented at an angle 332 to the Z-axis. For example, the angle 332 may be 30-60 degrees. Then in a third example routine ("routine3"), the first side 34 of the populated matchplate 200 in the tray holder 326 is positioned facing an inner top surface 334 of the spinning device 300. In a fourth example routine ("routine4"), the second side 36 of the populated matchplate 200 in the tray holder 326 is positioned facing the inner top surface 334 of the spinning device 300. In some examples, spinning the populated matchplate 200 may include executing routine3, routine4, or both in any order. For instance, the process can include only routine3, only routine4, or both routines performed sequentially in any sequence.

In FIG. 28, the tray holder 326 with the populated matchplate 200 is oriented parallel to the Z-axis in the spinning device 300, with the first side 34 of the populated matchplate 200 facing the centerline 330 of the spinning device 300. The populated matchplate 200 may undergo "local spinning," rotating about its own central vertical axis; that is, the vertical centerline 336 (in the Z-axis) of the populated matchplate 200. The curved arrow labeled "L" indicates this local axis rotation. Simultaneously or subsequently, the populated matchplate 200 may also undergo "global spinning" in one direction around the spinning device 300 vertical centerline 330 (about the Z-axis). The curved arrow labeled "G" indicates this global axis rotation.

Figure 29:
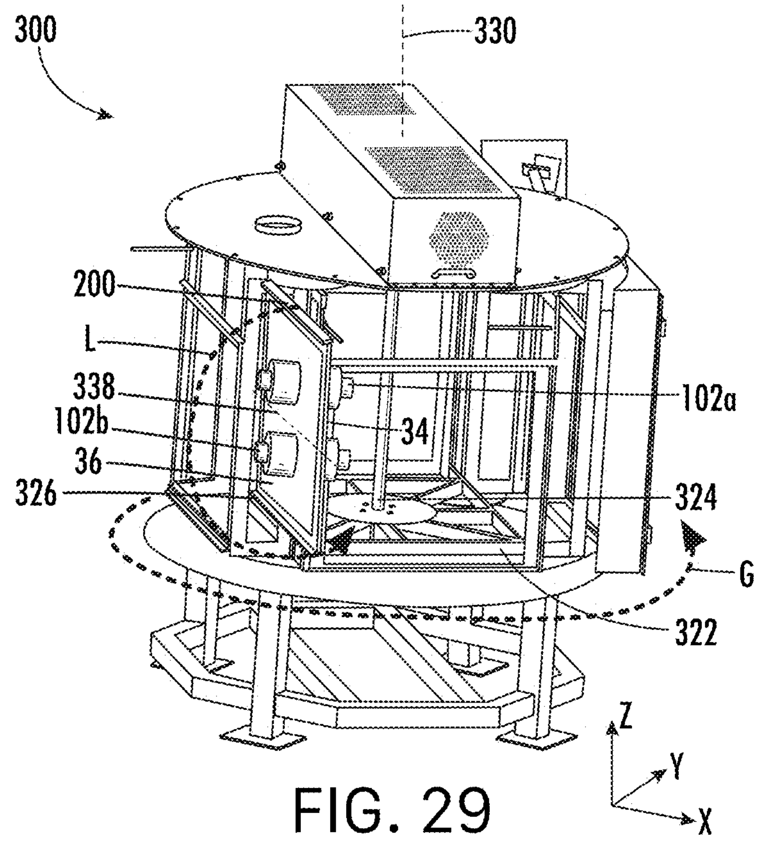

In FIG. 29, the tray holder 326 with the populated matchplate 200 is oriented parallel to the Z-axis in the spinning device 300, with the first side 34 of the populated matchplate 200 positioned facing the centerline 330 of the spinning device 300. The populated matchplate 200 may undergo "local spinning," rotating about its own central horizontal axis; that is the horizontal centerline 338 (in the X-axis) of the populated matchplate 200. The curved arrow labeled with "L" indicates this local axis rotation. Simultaneously or subsequently, the populated matchplate 200 may undergo "global spinning" in one direction around the spinning device 300 vertical centerline 330 (about the Z-axis). The curved arrow labeled with "G" indicates the global axis rotation.

During spinning, the populated matchplate 200 is gyroscopically spinning within the spinning device 300. This refers to the rotation of the tray holder 326 and populated matchplate 200 in such a way that it maintains stability and orientation despite external forces. This ensures uniform removal of the surface finish material, as the platform 322 remains steady and consistent in its motion.

Figure 30:
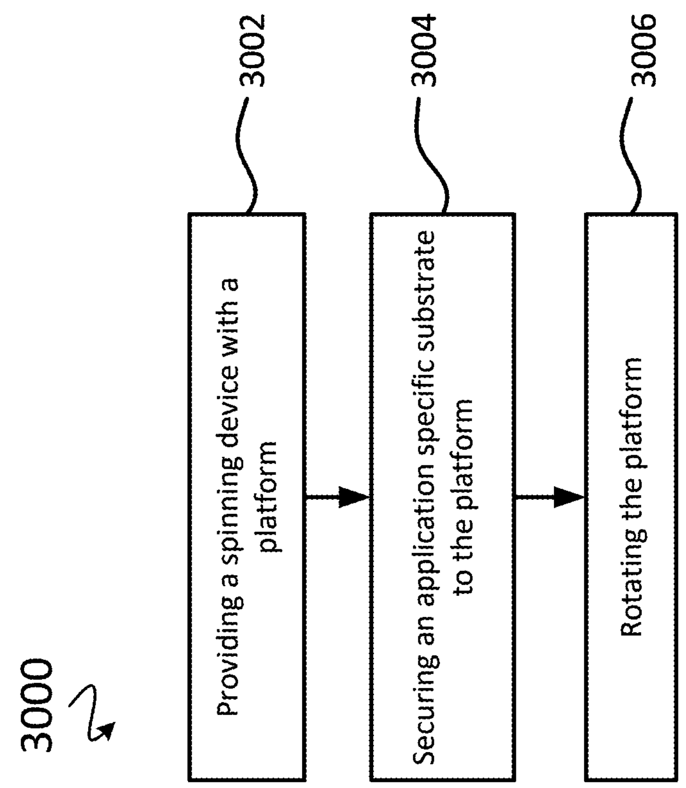
FIG. 30 is a flowchart for a method for spinning an application-specific substrate, in accordance with some aspects.

FIG. 30 is a flowchart for a method for spinning an application-specific substrate, in accordance with some aspects. The particular steps, order of steps, and combination of steps are shown for illustrative and explanatory purposes only. Other examples can implement different particular steps, orders of steps, and combinations of steps to achieve similar functions or results. A method 3000 begins at block 3002 where a spinning device 300 is provided. The spinning device 300 has a platform 322 that rotates about an axis. At block 3004, an application-specific substrate 18 is secured to the platform 322. In some examples, the application-specific substrate 18 is a populated matchplate 200. The application-specific substrate 18 includes the substrate and content. The application-specific substrate 18 is at least partially wetted with an uncured surface finish material. At block 3006, the platform 322 is rotated. The first portion of the uncured surface finish material is retained on the application-specific substrate, and a second portion of the uncured surface finish material is removed.

The spinning device 300 may include a barcode scanner and various other sensors (e.g., camera, ultrasonic, proximity, laser displacement, infrared, spectrometer, etc.) for traceability and functional/analytical purposes. These sensors provide information about the populated matchplate 200 and its geometries, such as serial number, installation location, orientation, and other metrics. Examples of these metrics include weight/mass, the amount of residual resin extracted from the spin process (which could potentially be reclaimed), and surface finishing.

In some aspects, the populated matchplate 200 can then be submitted into a curing process. Similar to the spinning device 300, a curing chamber is configured to accommodate a populated matchplate 200, ensuring that both the pattern 102*a* on the first side 34 and the pattern 102*b* on the second side 36 are free from obstacles and fully exposed to the curing source (e.g., a UV curing light source). For example, the curing chamber is sized to accommodate the populated matchplate 200 at an approximate midsection of a curing chamber. Duplicate UV curing light sources may be positioned above and below the populated matchplate 200 for uniform curing. Similarly, duplicate nitrogen or other oxygen depleting mediums entry points can be positioned above and below the populated matchplate 200 for quick oxygen purging before and during the cure process. The curing chamber may include motion systems to move and spin the populated matchplate 200 as necessary to achieve sufficient curing. As with the spinning device 300, data (e.g., matchplate identification number, cure time, cure intensity, oxygen levels, nitrogen purge time, confirmation of adequate curing, error states, etc.) may be acquired from the curing process and uploaded locally or remotely to an external resource such as a cloud, servers, virtual machines, or the like.

Once the populated matchplate 200 has completed the spin and cure processes, it can undergo various coating processes to optimize the sand-casting process. For instance, the populated matchplate 200 can be nickel-coated to enhance durability. Additionally, the pattern and matchplate 100 can be ceramic coated to increase durability and wear resistance during the sand-casting process. Other coating examples include electroless nickel, vacuum deposited, among others.

Aspects disclosed herein relate to additive manufacturing systems and methods for printing an application-specific substrate or printing content on an application-specific substrate. This includes, for example, 3D printing content directly onto a pre-formed application-specific substrate, or concurrently printing both the substrate and the content in a single additive manufacturing process. In some examples, a second application-specific substrate is used as a build plate. The described systems and methods may be applied to a wide range of domains, including but not limited to printed circuit board assemblies, semiconductor wafers, and microfluidic devices. These examples are illustrative and not limiting; the disclosed techniques may be applied across numerous other industries such as footwear and apparel, medical devices and prosthetics, consumer electronics, aerospace components, automotive parts, and more. The flexibility of the approach enables customized manufacturing tailored to specific functional or structural requirements across diverse sectors.

Aspects disclosed herein relate to additive manufacturing systems and methods for creating matchplates. This includes, for example, 3D printing patterns directly onto a matchplate or concurrently printing both the matchplate and the patterns in a single additive manufacturing process. While the disclosed systems and methods are particularly suited for sand-casting applications, they are not limited to such use. These techniques may also be applied to a variety of other substrate-based molding processes, including vacuum forming, packaging applications, molded fiber packaging, fiberglass molding, composite molding, and additional use cases across related industries.

Example aspects of the present systems and methods are described in the clauses below.

Clause 1. A method comprising: providing a photoreactive 3D printing system (PRPS); positioning an application-specific substrate in a holding device of the PRPS; and printing content on the application-specific substrate, wherein the content and the application-specific substrate are incorporated in a finished product after the printing.

Clause 2. The method of clause 1, wherein the application-specific substrate is a matchplate.

Clause 3. The method of any of clauses 1-2, further comprising: during the printing, aligning the content to a feature on the application-specific substrate.

Clause 4. The method of clause 3, wherein the aligning comprises: detecting the feature on the application-specific substrate from image data from a camera; estimating, by a controller of the PRPS, a position and an orientation of the feature relative to the camera; and operatively controlling, by the controller of the PRPS, an image projector of the PRPS to adjust properties and alignment of a position of the content based on the position and the orientation of the feature.

Clause 5. The method of any of clauses 3-4, wherein the feature is a fiducial mark, the fiducial mark being at least one of an individual circular dot, checkerboard pattern, circular dots pattern, ArUco marker, ChArUco marker, image, tag AprilTag, QR code, barcode, dot matrix code, dot peen marking or aperture.

Clause 6. The method of any of clauses 3-5, wherein the feature is a fixture element.

Clause 7. The method of any of clauses 3-5, wherein the feature is a defined portion of the application-specific substrate before the printing.

Clause 8. The method of any of clauses 1-7, further comprising; before positioning the application-specific substrate, printing a fixture element on a global substrate.

Clause 9. The method of any of clauses 1-8, further comprising: after the printing of the fixture element, positioning the global substrate in the holding device; and positioning the application-specific substrate in the global substrate.

Clause 10. The method of any of clauses 8-9, wherein the global substrate is a second application-specific substrate or a build plate of the PRPS.

Clause 11. The method of any of clauses 1-10, wherein the application-specific substrate has a plurality of through holes, each through hole extending from a first side of the application-specific substrate to a second side of the application-specific substrate, allowing resin to pass through.

Clause 12. The method of any of clauses 1-11, further comprising: removing the application-specific substrate from the holding device after the content is printed on a first side of the application-specific substrate; positioning the application-specific substrate so a second side of the application-specific substrate faces toward an image projector of the PRPS; and printing further content on the second side of the application-specific substrate.

Clause 13. The method of any of clauses 1-12, further comprising: providing a spinning device, the spinning device having a platform that rotates about an axis; securing a populated application-specific substrate to the platform, the populated application-specific substrate comprising the content and the application-specific substrate, wherein the populated application-specific substrate is at least partially wetted with an uncured surface finish material; and rotating the platform, wherein the first portion of the uncured surface finish material is retained on the populated application-specific substrate and a second portion of the uncured surface finish material is removed.

Clause 14. A method comprising: providing a photoreactive 3D printing system (PRPS); positioning a global substrate in a holding device of the PRPS; printing a feature on the global substrate; positioning an application-specific substrate on the global substrate according to the feature; and printing content on the application-specific substrate, wherein the content and the application-specific substrate are incorporated in a finished product after the printing.

Clause 15. The method of clause 14, wherein the global substrate is a second application-specific substrate or a build plate of the PRPS.

Clause 16. The method of any of clauses 14-15, wherein the application-specific substrate is a circuit board or a wafer polishing wheel.

Clause 17. The method of any of clauses 14-16, wherein the positioning the application-specific substrate comprises printing the application-specific substrate on the global substrate.

Clause 18. The method of any of clauses 14-17, wherein the feature is a fiducial mark, the fiducial mark being at least one of an individual circular dot, checkerboard pattern, circular dots pattern, ArUco marker, ChArUco marker, image, tag AprilTag, QR code, barcode, dot matrix code, dot peen marking or aperture.

Clause 19. The method of any of clauses 14-17, wherein the feature is a fixture element.

Clause 20. The method of any of clauses 14-19, further comprising: during the printing, aligning the content to at least one feature on the application-specific substrate or global substrate.

Clause 21. The method of clause 20, wherein the aligning comprises: detecting the at least one feature on the application-specific substrate or global substrate from image data from a camera; estimating, by a controller of the PRPS, a position and an orientation of the least one feature relative to the camera; and operatively controlling, by the controller of the PRPS, an image projector of the PRPS to adjust properties and alignment of a position of the content based on the position and the orientation of the at least one feature.

Clause 22. The method of any of clauses 20-21, wherein the at least one feature is a fiducial mark, the fiducial mark being at least one of an individual circular dot, checkerboard pattern, circular dots pattern, ArUco marker, ChArUco marker, image, tag AprilTag, QR code, barcode, dot matrix code, dot peen marking or aperture.

Clause 23. The method of any of clauses 20-21, wherein the at least one feature is a fixture element.

Clause 24. The method of any of clauses 20-21, wherein the at least one feature is a defined portion of the application-specific substrate before the printing.

Clause 25. The method of any of clauses 14-24, further comprising: reusing the global substrate with the feature in subsequent printings.

Reference has been made in detail to aspects of the disclosed invention, one or more examples of which have been illustrated in the accompanying figures. Each example has been provided by way of explanation of the present technology, not as a limitation of the present technology. In fact, while the specification has been described in detail with respect to specific example of the invention, it will be appreciated that those skilled in the art, upon attaining an understanding of the foregoing, may readily conceive of alterations to, variations of, and equivalents to these examples. For instance, features illustrated or described as part of one example may be used with another example to yield a still further example. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:

providing a photoreactive 3D printing system (PRPS);

positioning an application-specific substrate in a holding device of the PRPS; and printing content on the application-specific substrate, wherein the content and the application-specific substrate are incorporated in a finished product after the printing.

2. The method of claim 1, wherein the application-specific substrate is a matchplate.

3. The method of claim 1, further comprising:

during the printing, aligning the content to a feature on the application-specific substrate.

4. The method of claim 3, wherein the aligning comprises:

detecting the feature on the application-specific substrate from image data from a camera;

estimating, by a controller of the PRPS, a position and an orientation of the feature relative to the camera; and operatively controlling, by the controller of the PRPS, an image projector of the PRPS to adjust properties and alignment of a position of the content based on the position and the orientation of the feature.

5. The method of claim 3, wherein the feature is a fiducial mark, the fiducial mark being at least one of an individual circular dot, checkerboard pattern, circular dots pattern, ArUco marker, ChArUco marker, image, tag AprilTag, QR code, barcode, dot matrix code, dot peen marking or aperture.

6. The method of claim 3, wherein the feature is a fixture element.

7. The method of claim 3, wherein the feature is a defined portion of the application-specific substrate before the printing.

8. The method of claim 1, further comprising;

before positioning the application-specific substrate, printing a fixture element on a global substrate.

9. The method of claim 8, further comprising:

after the printing of the fixture element, positioning the global substrate in the holding device; and positioning the application-specific substrate in the global substrate.

10. The method of claim 8, wherein the global substrate is a second application-specific substrate or a build plate of the PRPS.

11. The method of claim 1, wherein the application-specific substrate has a plurality of through holes, each through hole extending from a first side of the application-specific substrate to a second side of the application-specific substrate, allowing resin to pass through.

12. The method of claim 1, further comprising:

removing the application-specific substrate from the holding device after the content is printed on a first side of the application-specific substrate;

positioning the application-specific substrate so a second side of the application-specific substrate faces toward an image projector of the PRPS; and printing further content on the second side of the application-specific substrate.

13. The method of claim 1, further comprising:

providing a spinning device, the spinning device having a platform that rotates about an axis;

securing a populated application-specific substrate to the platform, the populated application-specific substrate comprising the content and the application-specific substrate, wherein the populated application-specific substrate is at least partially wetted with an uncured surface finish material; and rotating the platform, wherein a first portion of the uncured surface finish material is retained on the populated application-specific substrate and a second portion of the uncured surface finish material is removed.

14. A method comprising:

providing a photoreactive 3D printing system (PRPS);

positioning a global substrate in a holding device of the PRPS;

printing a feature on the global substrate;

positioning an application-specific substrate on the global substrate according to the feature; and printing content on the application-specific substrate, wherein the content and the application-specific substrate are incorporated in a finished product after the printing.

15. The method of claim 14, wherein the global substrate is a second application-specific substrate or a build plate of the PRPS.

16. The method of claim 14, wherein the application-specific substrate is a circuit board or a wafer polishing wheel.

17. The method of claim 14, wherein the positioning the application-specific substrate comprises printing the application-specific substrate on the global substrate.

18. The method of claim 14, wherein the feature is a fiducial mark, the fiducial mark being at least one of an individual circular dot, checkerboard pattern, circular dots pattern, ArUco marker, ChArUco marker, image, tag AprilTag, QR code, barcode, dot matrix code, dot peen marking or aperture.

19. The method of claim 14, wherein the feature is a fixture element.

20. The method of claim 14, further comprising:

during the printing, aligning the content to at least one feature on the application-specific substrate or the global substrate.

21. The method of claim 20, wherein the aligning comprises:

detecting the at least one feature on the application-specific substrate or the global substrate from image data from a camera;

estimating, by a controller of the PRPS, a position and an orientation of the least one feature relative to the camera; and operatively controlling, by the controller of the PRPS, an image projector of the PRPS to adjust properties and alignment of a position of the content based on the position and the orientation of the at least one feature.

22. The method of claim 21, wherein the at least one feature is a fiducial mark, the fiducial mark being at least one of an individual circular dot, checkerboard pattern, circular dots pattern, ArUco marker, ChArUco marker, image, tag AprilTag, QR code, barcode, dot matrix code, dot peen marking or aperture.

23. The method of claim 21, wherein the at least one feature is a fixture element.

24. The method of claim 21, wherein the at least one feature is a defined portion of the application-specific substrate before the printing.

25. The method of claim 14, further comprising:

reusing the global substrate with the feature in subsequent printings.

* * * * *